United States Patent [19]
Danish et al.

[11] Patent Number: 5,983,219
[45] Date of Patent: *Nov. 9, 1999

[54] METHOD AND SYSTEM FOR EXECUTING A GUIDED PARAMETRIC SEARCH

[75] Inventors: Mohamed Sherif Danish, Los Altos Hills; Kris Walter Kimbrough, Sunnyvale, both of Calif.

[73] Assignee: Saggara Systems, Inc., Sunnyvale, Calif.

[ * ] Notice: This patent is subject to a terminal disclaimer.

[21] Appl. No.: 08/943,573

[22] Filed: Oct. 3, 1997

Related U.S. Application Data

[63] Continuation of application No. 08/323,186, Oct. 14, 1994, Pat. No. 5,715,444.

[51] Int. Cl.$^6$ .................................................. G06F 17/30
[52] U.S. Cl. ................................................................ 707/3
[58] Field of Search ........................................ 707/1, 3, 4

[56] References Cited

U.S. PATENT DOCUMENTS

| | | | |
|---|---|---|---|
| 4,775,935 | 10/1988 | Yourick ..................................... | 345/357 |
| 4,792,849 | 12/1988 | McCalley et al. ........................... | 348/7 |
| 4,821,211 | 4/1989 | Torres ....................................... | 345/357 |
| 4,879,648 | 11/1989 | Cochran et al. ........................... | 345/35.3 |
| 4,905,094 | 2/1990 | Pocock et al. ............................ | 386/106 |
| 4,959,686 | 9/1990 | Spallone et al. .......................... | 340/309.15 |
| 5,065,347 | 11/1991 | Pajak et al. ............................... | 345/118 |
| 5,122,972 | 6/1992 | Richards et al. .......................... | 345/338 |
| 5,124,942 | 6/1992 | Nielsen et al. ............................ | 345/336 |
| 5,187,797 | 2/1993 | Nielsen et al. ............................ | 345/338 |
| 5,206,949 | 4/1993 | Cochran et al. ........................... | 707/4 |
| 5,208,665 | 5/1993 | McCalley et al. ......................... | 348/12 |
| 5,241,671 | 8/1993 | Reed et al. ................................ | 707/104 |
| 5,263,174 | 11/1993 | Layman .................................... | 345/353 |
| 5,297,253 | 3/1994 | Meisel ...................................... | 345/357 |
| 5,319,542 | 6/1994 | King, Jr. et al. ........................... | 705/27 |
| 5,426,594 | 6/1995 | Wright et al. ............................. | 395/200.36 |
| 5,544,360 | 8/1996 | Lewak et al. .............................. | 707/1 |

FOREIGN PATENT DOCUMENTS

WO 94/12944  9/1994  WIPO .

OTHER PUBLICATIONS

AMP Flyer No. 65392; "Electronic Application Design Systems", 1992, AMP Incorporated, Harrisburg, PA.

User Guide: "enGenius"; Release 1.0, Sun (UNIX) UD–93–003–002, Info Enterprises, Inc., Phoenix, AZ.

AMP Booklet: "Your Introduction to EADS", #82829, 1991, AMP Incorporated, Harrisburg, PA.

*Primary Examiner*—Jack M. Choules
*Attorney, Agent, or Firm*—Wilson, Sonsini, Goodrich & Rosati

[57] ABSTRACT

A process for identifying a single item from a family of items presents a user with a feature screen having a series of groupings. Each grouping represents a feature having a set of alternatives from which to select. Selected alternatives are used as a selection criteria in a search operation. Results of the search operation is a revised feature screen indicating alternatives that remain available to the user for further selection and searching. The feature screen and search process, therefore, presents the user with a guided nonhierarchical parametric search to identify matching items based upon user specified criteria and priorities. Also disclosed is an adaptation of the claimed method and system appropriate in an Internet environment.

20 Claims, 30 Drawing Sheets

MAIN MENU

PICTURE SEARCH AND
SECOND LEVEL PICTURE SEARCH

VIEW CATALOG PAGE

CATALOG PAGE

Fig. 5

VIEW PART NUMBER INFORMATION

Fig. 11

| SCREEN TYPE | SCREEN | FEA. 1 | FEA. 2 | FEA. 3 | FEA. 4 | FEA. 5 | FEA. 6 | FEA. 7 | FEA. 8 | ... | FEA. 15 |
|---|---|---|---|---|---|---|---|---|---|---|---|
| F | 1600 | 50 | 38 | 32 | 31 | 34 | 40 | 41 | 42 | | |
| P | 1600 | 1001 | 1002 | 1003 | 1004 | 101 | 7 | 43 | 49 | | |
| F | 1200 | 32 | 30 | 4 | 7 | 14 | 100 | | | | |

Fig. 13

| FEATURE SCREEN | GROUPING SEQUENCE | SELECTION TYPE | FEATURE |
|---|---|---|---|
| 1575 | 1 | R | 57 |
| 1575 | 2 | R | 58 |
| 1575 | 3 | L | 69 |

Fig. 14

| SCREEN | FEATURE | ALTERNATIVE SEQUENCE | ALTERNATIVE |
|---|---|---|---|
| 1101 | 100 | 1 | 11 |
| 1101 | 100 | 2 | 7 |
| 1101 | 11 | 1 | 1 |
| 1101 | 11 | 2 | 2 |
| 1101 | 11 | 3 | 3 |

Fig. 18

| SCREEN | ITEM | ALT 1 | ALT 2 | ALT 3 | ALT 4 | ALT 5 | ALT 6 | ALT 7 | ALT 8 | ... | ALT 15 |
|---|---|---|---|---|---|---|---|---|---|---|---|
| 1600 | 63225-2 | 1 | | | | | | | | | |
| 1600 | 62092-1 | 1 | | | | | | 6 | | | |
| 1600 | 61400-1 | 25 | 1 | 2 | 1 | 3 | | 6 | 315 | | |
| 1600 | 61408-1 | 25 | 1 | 2 | 1 | 3 | | 1 | 315 | | |

Fig. 19

| ITEM | COMMENT | IMAGE |
|---|---|---|
| 62813-2 | Left handed flag | FAST_11D |
| 62814-1 | Right handed flag | FAST_11D |
| 61202-1 | UL Listed and CSA Certified for 22 AWG | FAST_13A |

FASTON Receptacles - Uninsulated
Go to Main Menu | View Family Picture

[?] *Specials:* None | For Posted Hermetic Tabs | Receptacle/Tab Combination

[?] *Tab Fit:* .110 x .016 | .110 x .020 | .110 x .025 | .110 x .032 | .187 x .015 | .187 x .017 | .187 x .020 | .187 x .032 | .205 x .020 | .205 x .032 | .250 x .020 | .250 x .032 | .312 x .032

[?] *Receptacle Style:* Straight | Flag | Reversible Flag

[?] *Insulation Support:* Insulation Support | Non-Insulation Support

[?] *Wire Type:* Regular Wire | Magnet Wire

[?] *Wire Range:* 12-10 | 12-10/(2)12/(2)14 | 12-10/(2)14 | 14-10 | 14-10/(2)14 | 16-12 | 16-12/(2)18 | 18-12 | 18-14 | 18-14/(2)16 | 18-14/(2)17 | 18-16 | 18-16/(2)18 | 20-14 | 20-16 | 20-16/(2)20 | 20-16/(2)20/23 | 20-18/(2)20 | 22-16 | 22-18 | 22-20 | 24-19 | 24-20 | 24-22 | 26-22

[?] *Insertion Force:* Normal | Low

[?] *Material:* Brass | Phosphor-Bronze | Steel

[?] *Finish:* None | Tin | Pre Tin | Silver | Nickel

[?] *Crimp Type:* "F" | Tab-Lok

FASTON Receptacles - Uninsulated       207

*Go to Main Menu | View Family Picture | Reset Selections | View Details*

Number of Matching P/Ns: 34 — 47       206

[?] *Specials:* [None] | For Posted Hermetic Tabs | Receptacle/Tab Combination

[?] *Tab Fit:* .110 x .016 | .110 x .020 | .110 x .025 | .110 x .032 | .187 x .015 | .187 x .017 | .187 x .020 | .187 x .032 | .205 x .020 | .205 x .032 | .250 x .020 | .250 x .032 | .312 x .032

[?] *Receptacle Style:* Straight | Flag | Reversible Flag       37

[?] *Insulation Support:* Insulation Support | [Non-Insulation Support]

[?] *Wire Type:* [Regular Wire] | Magnet Wire       34

[?] *Wire Range:* 12-10 | 12-10/(2)12/(2)14 | 12-10/(2)14 | 14-10 | 14-10/(2)14 | 16-12 | 16-12/(2)18 | 18-12 | 18-14 | 18-14/(2)16 | 18-14/(2)17 | 18-16 | 18-16/(2)18 | 20-14 | 20-16 | 20-16/(2)20 | 20-16/(2)20/23 | 20-18/(2)20 | 22-16 | 22-18 | 22-20 | 24-19 | 24-20 | 24-22 | 26-22

[?] *Insertion Force:* [Normal] | Low

[?] *Material:* Brass | Phosphor-Bronze | Steel       8

[?] *Finish:* None | Tin | Pre Tin | Silver | Nickel

[?] *Crimp Type:* "F" | Tab-Lok       7

Fig. 27

FASTON Receptacles - Uninsulated

*Go to Main Menu* | *View Family Picture* | *Reset Selections* | *View Details*

Number of Matching P/Ns: 13  —14

[?] *Specials:* [None] | For Posted Hermetic Tabs | Receptacle/Tab Combination

[?] *Tab Fit:* .110 x .016 | .110 x .020 | .110 x .025 | .110 x .032 | .187 x .015 | .187 x .017 | .187 x .020 | .187 x .032 | .205 x .020 | .205 x .032 | .250 x .020 | [.250 x .032] | .312 x .032

[?] *Receptacle Style:* Straight | Flag | Reversible Flag —14

[?] *Insulation Support:* Insulation Support | [Non-Insulation Support]

[?] *Wire Type:* [Regular Wire] | Magnet Wire

[?] *Wire Range:* 12-10 | 12-10/(2)12/(2)14 | 12-10/(2)14 | 14-10 | 14-10/(2)14 | 16-12 | 16-12/(2)18 | 18-12 | 18-14 | 18-14/(2)16 | 18-14/(2)17 | 18-16 | 18-16/(2)18 | 20-14 | 20-16 | 20-16/(2)20 | 20-16/(2)20/23 | 20-18/(2)20 | 22-16 | 22-18 | 22-20 | 24-19 | 24-20 | 24-22 | 26-22

[?] *Insertion Force:* [Normal] | Low

[?] *Material:* Brass | Phosphor-Bronze | Steel

[?] *Finish:* None | Tin | Pre Tin | Silver | Nickel

[?] *Line:* Premier | Budget | Economy | Commercial | Moldable

[?] *Crimp Type:* "F" | Tab-Lok

Fig. 28

FASTON Receptacles - Uninsulated

*Go to Main Menu* | *View Family Picture* | *Reset Selections* | *View Details*

Matching P/N(s): 42845-1 —— 46

---

[?] *Specials:* [None] | For Posted Hermetic Tabs | Receptacle/Tab Combination

[?] *Tab Fit:* .110 x .016 | .110 x .020 | .110 x .025 | .110 x .032 | .187 x .015 | .187 x .017 | .187 x .020 | .187 x .032 | .205 x .020 | .205 x .032 | .250 x .020 | [.250 x .032] | .312 x .032

[?] *Receptacle Style:* [Straight] | Flag | Reversible Flag

[?] *Insulation Support:* Insulation Support | [Non-Insulation Support]

[?] *Wire Type:* [Regular Wire] | Magnet Wire

[?] *Wire Range:* 12-10 | 12-10/(2)12/(2)14 | 12-10/(2)14 | 14-10 | 14-10/(2)14 | 16-12 | 16-12/(2)18 | 18-12 | [18-14] | 18-14/(2)16 | 18-14/(2)17 | 18-16 | 18-16/(2)18 | 20-14 | 20-16 | 20-16/(2)20 | 20-16/(2)20/23 | 20-18/(2)20 | 22-16 | 22-18 | 22-20 | 24-19 | 24-20 | 24-22 | 26-22

[?] *Insertion Force:* [Normal] | Low

[?] *Material:* [Brass] | Phosphor-Bronze | Steel

[?] *Finish:* [None] | Tin | Pre Tin | Silver | Nickel

[?] *Line:* Premier | Budget | [Economy] | Commercial | Moldable

[?] *Crimp Type:* ["F"] | Tab-Lok

Fig. 29

FASTON Receptacles - Uninsulated

Go to Main Menu | Go to Search Screen | Next P/N 1 of 2 - P/N: 41772

Features and Properties

| | | | |
|---|---|---|---|
| Specials | None | Fax Code | 1001-1200 |
| Tab Fit | .250 x .032 | UL Listed | Approved |
| Receptacle Style | Straight | RU (U'L Component Program) | No |
| Insulation Support | Insulation Support | CSA Certified | Approved |
| Wire Type | Regular Wire | - | - |
| Wire Range | 22-18 | Packaging | Strip Form |
| Insulation Dia. | .090-.130 | Stock Thick. | .016 |
| Insertion Force | Normal | Dim. L | .755 |
| Material | Brass | Dim. T | .090 |
| Finish | Tin | - | - |
| Line | Premier | - | - |
| Crimp Type | "F" | - | - |

Line Art:

.300    .305    L

*Line art represents typical product only.*

Fig. 30

AMP Electronic Catalog -- Alphabetical Index

*Return to Main Menu*

<u>A</u> / <u>B</u> / <u>C</u> / <u>D</u> / <u>E</u> / <u>F</u> / <u>G</u> / <u>H</u> / <u>K</u> / <u>L</u> / <u>M</u> / <u>P</u> / <u>R</u> / <u>S</u> / <u>T</u> / <u>U</u> / <u>W</u>

<u>.062 Commercial Pin and Socket Rectangular Connectors</u>
<u>.093 Commercial Pin and Socket Rectangular Connectors</u>

*A*

<u>Alternator Eyelet Terminal</u>
<u>AMPIP Housings for FASTON Receptacles</u>
<u>AMPLI-BOND Ring and Spade Tongue Terminals</u>
<u>AMPLIVAR Receptacles for Tabs, Magnet Wire</u>
<u>AMPLIVAR Ring Tongue Terminals, Magnet Wire</u>
<u>AMPLIVAR Splices, Magnet Wire</u>
<u>AMPLIVAR Tabs, Magnet Wire</u>

*B*

<u>Budget Line FASTON Terminals</u>

Fig. 32

AMP Electronic Catalog -- View Part Number

*Return to Main Menu*

*In the current version you must enter an existing AMP Part Number! Future versions will be enhanced to automatically locate dash numbers from a "base only" part number.*

*View Detailed Information About a P/N*

Enter AMP Part Number: [          ]

Press this button when complete: [View Details]

Fig. 35

METHOD AND SYSTEM FOR EXECUTING A GUIDED PARAMETRIC SEARCH

This application is a continuation of application Ser. No. 08/323,186, filed Oct. 14, 1997 now U.S. Pat. No. 5,715,444.

FIELD OF THE INVENTION

The present invention relates to navigation systems and more particularly to a process for identifying an item within a family of items.

BACKGROUND

Increased memory and remote electronic data storage capacity offers access to large amounts of data in a very convenient form and physical size. Data may be available on diskette, CD-ROM, magnetic tape, and on line to a centrally located computer and memory storage medium. The challenge remains to extract information from the data simply and efficiently and to have confidence in the result that all relevant items have been uncovered. The widespread use of computers and electronic searching has attracted the attention of large manufacturers offering a vast array of products in an increasingly competitive environment. In an effort to offer product that closely matches customer needs, manufacturers proliferate product and product feature alternatives. This proliferation of product offerings provides the customer with more options from which to choose, however, it also increases the difficulty of finding the one product offering that best addresses a specific customer's needs. Manufacturer's response has been to offer a series of specialized glossy catalogs and trained sales personnel to aid customers in their product selection effort. To a manufacturer, these catalogs are costly to create, distribute, and update. To a consumer, these catalogs are cumbersome to use and store. In order to further breakdown obstacles between a customer's need to obtain a product and purchase of the right product, a manufacturer may offer what is typically a large catalog or series of catalogs of product offerings, electronically. An electronic catalog offers the convenience of compact physical size coupled with automated search and retrieval.

One known search method of automated search and retrieval employs Boolean logic and keyword searching. The Boolean logic keyword search is appropriate for locating concepts discussed in textbased references. The Boolean search is based on certain words or word relationships contained in a relevant collection of materials. Formulating an accurate and efficient Boolean search requires a certain level of knowledge about the structure of the data, the type of material being searched, the classification of the data if there is one, and any keywords or standard terminology likely to be used to express the concepts being searched. The Boolean logic keyword search is beneficial because it permits a user to formulate a search that accurately reflects certain priorities for the search. The Boolean logic keyword search, however, is inappropriate for locating a particular mix of feature alternatives within a database of product information. One searching for certain information may not be familiar with the terminology used in selecting a particular product. Multiple products may use different but synonymous terms. A concept expressed by a standard industry term in one industry may be different from a standard industry term in a different industry. A keyword search would require searching on all synonyms used in order to ensure a complete and accurate result.

Other interactive user interfaces use a hierarchial search. Hierarchial searches may also be referred to as tree searches and are a form of guided search. A variation of the hierarchical search is disclosed in U.S. Pat. No. 4,821,211 to Torres. A hierarchial search method offers a list of alternatives from which to select. The first list of alternatives has the highest priority and defines the profile of or relates to the remaining alternatives. Once selected, the system branches to another screen or lower level screen with another list of alternatives. The next list of alternatives having a lower priority. The system branches down through the various menus of alternatives having decreasing priority levels. There are known various methods of presenting graphical representations of a hierarchy to a user to help a user understand the current position within the hierarchy and the options for further movement within the hierarchy. A hierarchial search is appropriate for narrowing down to a subset of items from which to select based on alternatives having a fixed or necessarily depending priority level. Using this method, the available alternatives shown on any screen depend upon prior alternative selections. The hierarchial search is beneficial in that it is guided. A guided search meaning that use of the search does not require knowledge of the terminology used within the database due to the fact that terms for the available concepts are offered to a user. A user then makes a selection before proceeding to the next level. The hierarchial search, however, is cumbersome unless the selection of one alternative obviates the availability of other alternatives. Unless a user knows exactly what he or she wants and with what priority, each "branch" in the tree must be explored in order to gather an understanding of how certain selections affect remaining alternatives. In the case of a list of product offerings, given a set of alternative features for a single product, a number of people will have differing priorities for those alternatives and the priorities will have varying weights. Another disadvantage of the hierarchial search is that the greater the number of alternatives and permutations of alternative selections, the more levels there are from which to select additional alternatives. Multiple levels of screens increase the time and complexity of the search and are not as user-friendly or as intuitive to use as a simpler single screen user interface. The need for a nonhierarchial guided parametric search is based on the principle that given a family of items having certain features associated therewith each feature having respective alternatives, the number of products actually offered by a manufacturer is less than the number of possible permutations of alternatives. For the purposes of a simple illustration, a family of items may be cars in which features include color, number of doors, transmission style, braking style, etc. If a feature of a car is color, respective alternatives may be red, white, and blue. If a feature is transmission styles, respective alternatives may be automatic, three speed, four speed, and five speed. The vast number of permutations coupled with the fact that only a subset of the permutations are actually offered for sale as products is a source of frustration to a customer with a given set of needs. For instance red cars may come only with manual transmission and not automatic transmission. As features and alternatives proliferate, so does the level of frustration in isolating the one desired item. Accordingly, there is a need for a method to aid a user in identifying an item among a family of items based on selections of alternatives among features associated with the items.

Different customers have different preferences, and in many cases a customer is somewhat flexible concerning the product to buy as long as the customer is informed as to how the selection of one alternative affects the availability of another alternative. In addition, one customer may want a red car and accept manual transmission, while another customer must have automatic transmission and color is unimportant. Accordingly, there is a need for a search method that provides information interactively as to how certain alternative selections affect the number of remaining alternatives and/or matching items and allows a user to modify selection priorities during the course of the search.

There remains a need, therefore, for an automated search and retrieval system that can assist a user in finding a product having appropriate features to address identified needs and priorities of needs.

Associated with some known electronic search and retrieval systems is a certain amount of frustration when the defined search does not identify a single item. The user is obliged to further widen the field of search or modify a search criteria in order to identify any parts. The need to oblige the user to widen the field of search is due to the fact that hierarchial and keyword Boolean searches do not have any information in the search criteria to permit automatic adjustment of the field of search. There is a need therefore, for a electronic search method that is able to guarantee a user that at least one item will be identified.

SUMMARY OF THE INVENTION

It is therefore an object of the invention to provide a guided parametric search to isolate a subfamily of items within a family of items based on alternatives associated with each item.

It is a further object of the invention to organize the alternatives into groupings visually relating a feature and respective alternatives.

It is a further object of the invention to provide an automated search that interactively indicates how selected alternatives affects availability of remaining alternatives.

It is a further object of the present invention to provide an automated search method that can guarantee identification of at least one item for each search.

It is a feature of the present invention that a user is assisted in identifying a subfamily of items within a family of items by: providing a computer readable data file of stored information representing at least one family of items, the data file identifying at least one alternative for each item, reading the data file, displaying a feature screen indicating said alternatives represented in the family, accepting selected alternatives, determining the subfamily of items where each item in the subfamily satisfies the selected alternatives, determining available alternatives represented in the subfamily and unavailable alternatives unrepresented in the subfamily, and revising the feature screen indicating the available alternatives as distinct from the unavailable alternatives.

It is an advantage of the invention that revision of the feature screen provides an indication to the user as to how selected alternatives, or selection criteria, affect the profile of the subfamily satisfying the selection criteria. The revision answers the question; How does the selection of one alternative affect my remaining alternatives?

It is a feature of the invention that the process may be implemented in a server and client configuration for use on the Internet.

It is an advantage of the invention that an Internet configuration may be used as an electronic catalog, providing an electronic alternative to updating and distributing product and/or service information.

Other advantages and results of the invention are apparent from the following detailed description by way of example, from accompanying drawings, and from the spirit and scope of the appended claims.

BRIEF DESCRIPTION OF THE DRAWINGS

FIG. 5 is a view of a Catalog page screen.

FIG. 11 is a graphical representation of the Database Organization Datafile and example data records therein.

FIG. 13 is a graphical representation of the feature screen Group Datafile and example data records therein.

FIG. 14 is a graphical representation of the feature screen Description Datafile and example data records therein.

FIG. 18 is a graphical representation of the Part Number Properties Datafile and example data records therein.

FIG. 19 is a graphical representation of the Extra Properties Datafile and example data records therein.

FIG. 26 is a feature screen used in a preferred embodiment of the invention in an Internet environment.

FIG. 27 is a feature screen revised from the feature screen of FIG. 26 and having "Non-Insulation Support" and "None" for the "Specials" feature as selected alternatives and is updated with available alternatives underlined and unavailable alternatives not underlined.

FIG. 28 is a further revision of the feature screen of FIG. 27 narrowing down the subfamily to thirteen items.

FIG. 29 is a further revision of the feature screen of FIG. 28 narrowing down the subfamily to one item.

FIG. 30 is a property screen used in a preferred embodiment of the invention in the Internet environment.

FIG. 32 is an alphabetical search menu used in a preferred embodiment of the invention in the Internet environment.

FIG. 35 is a view part number menu used in a preferred embodiment of the invention in the Internet environment.

DETAILED DESCRIPTION

A nonhierarchial guided parametric search is executed on a computer and permits a user to select a family of items 1 from among a plurality of families of electrical connectors, via a Main Menu 40. A family of items 1 could be any commercial product or service offering with a common set of features 5 and alternatives 6, associated therewith. Preferably, the alternatives 6 are item qualifiers and related to customer purchase options and criteria. In a preferred embodiment, an example of a family of items 1 is FASTON Receptacles—Uninsulated. FASTON in a trademark of AMP Incorporated. Alternative embodiments may include a family 1 of service providers having features 5 and alternatives 6 relating to provider qualifications. It is apparent, therefore, that "family" as used herein is broadly defined as a collection of offerings with specific qualifiers and/or attributes, where one would want to identify an offering by specifying its qualifiers and/or attributes. The preferred embodiment, however, is adapted to a family of physical items, specifically electrical connectors.

Figure 1:
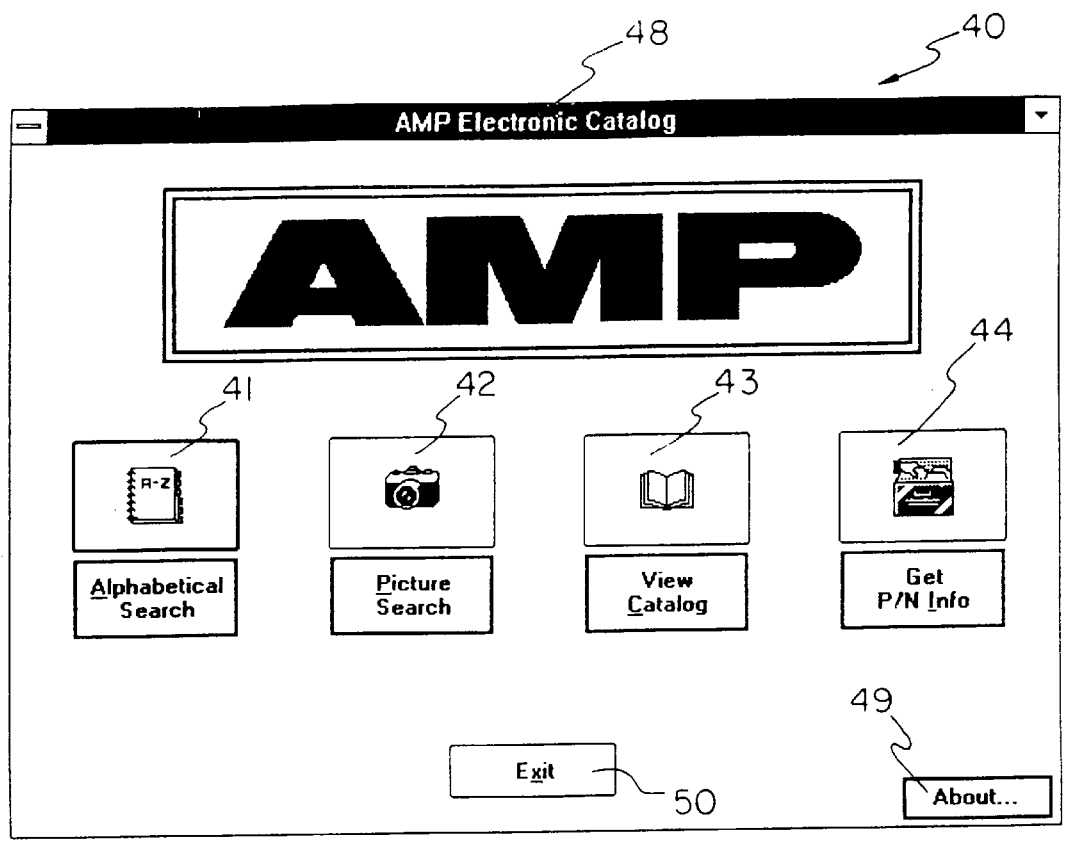
FIG. 1 is a view of a Main Menu screen.

An example of the Main Menu 40 is shown in FIG. 1. The Main Menu 40 offers an interactive pick for an Alphabetical Search 41, a Picture Search 42, a View Catalog 43, or a Get Part Number Information 44 as methods for identifying a single family of items 1. The About pick 49 provides administrative information about the vendor such as telephone number, address, and facsimile phone number. The Exit pick 50 exits to the computer operating system.

Figure 2:
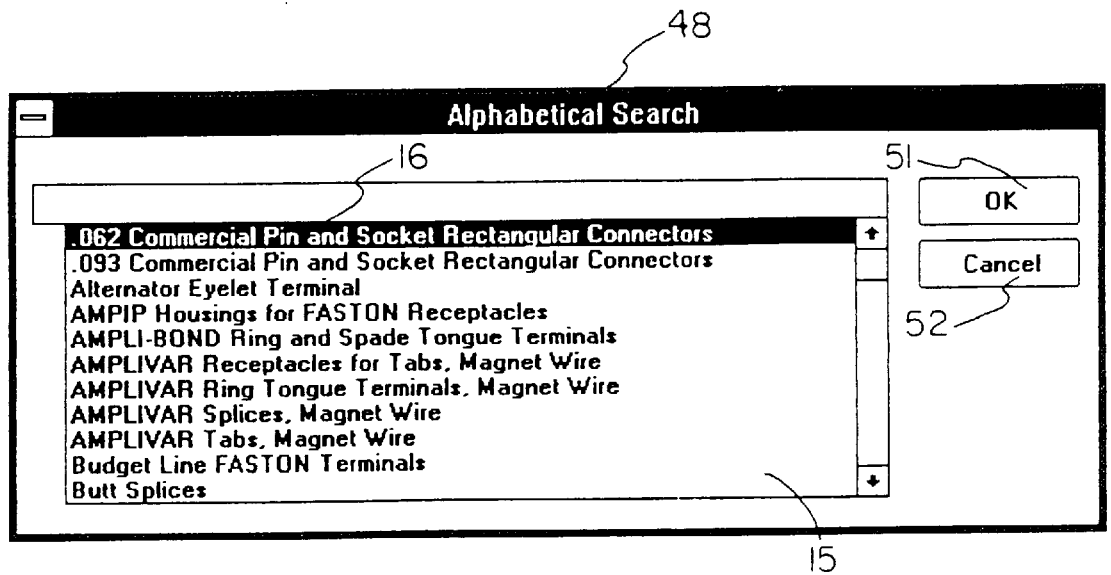
FIG. 2 is a view of an Alphabetical Search screen.

An example of an Alphabetical Search menu is shown in FIG. 2. The Alphabetical Search pick 41 provides to the user a list box 15 comprising alphabetical listbox entries 16 of industry standard terms and proprietary terms for product families 1 that are available on a data file to be searched. Each listbox entry 16 in the Alphabetical Search menu represents either a subfamily 2, a family of items 1 or a cluster of families 4. The user selects an alphabetical entry 16 and OK pick 51. If the selected listbox entry 16 represents a cluster of families 4, the system branches to a picture search 42 described herein below. The user further delineates the family of items 1 that is of interest by further selection within the cluster 4 using a hierarchical selection method. If the alphabetical entry 16 requires no further delineation, the system branches to a feature screen 9. The cancel pick 52 returns the user to the Main menu 40.

Figure 3:
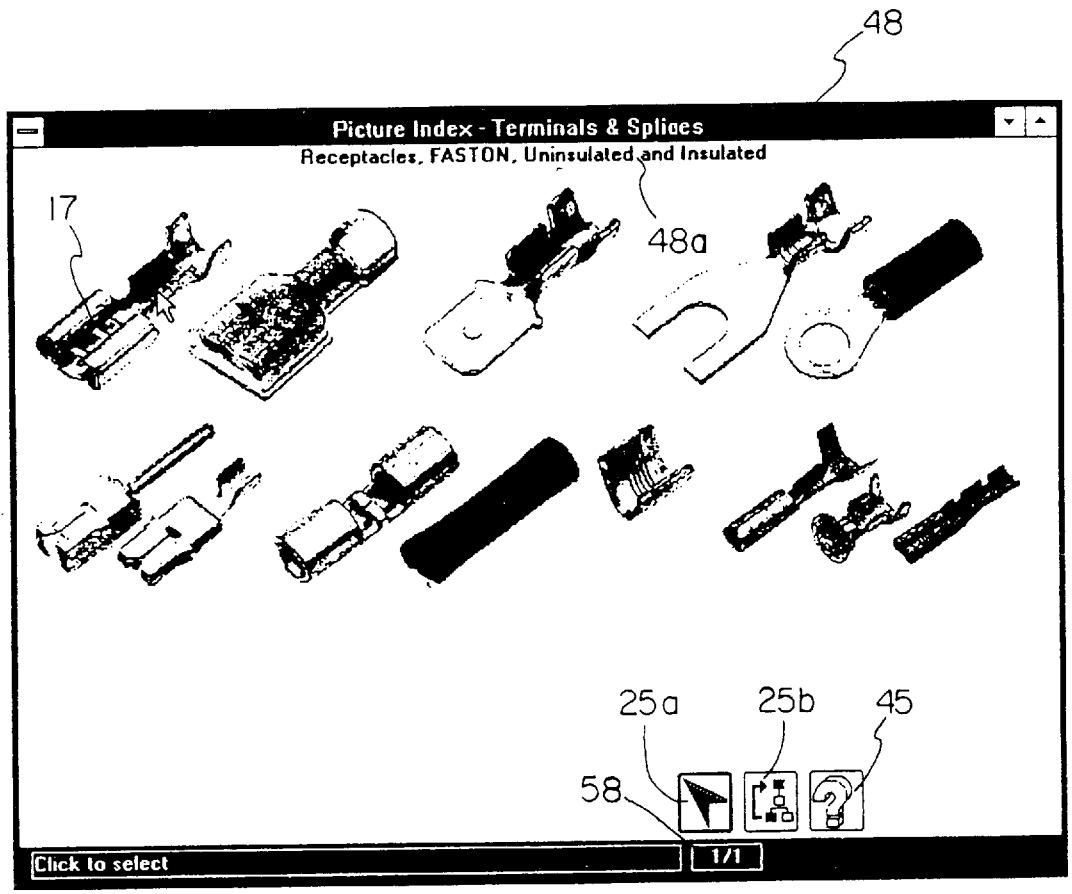
FIG. 3 is a view of a second level Picture Search screen.
Figure 4:
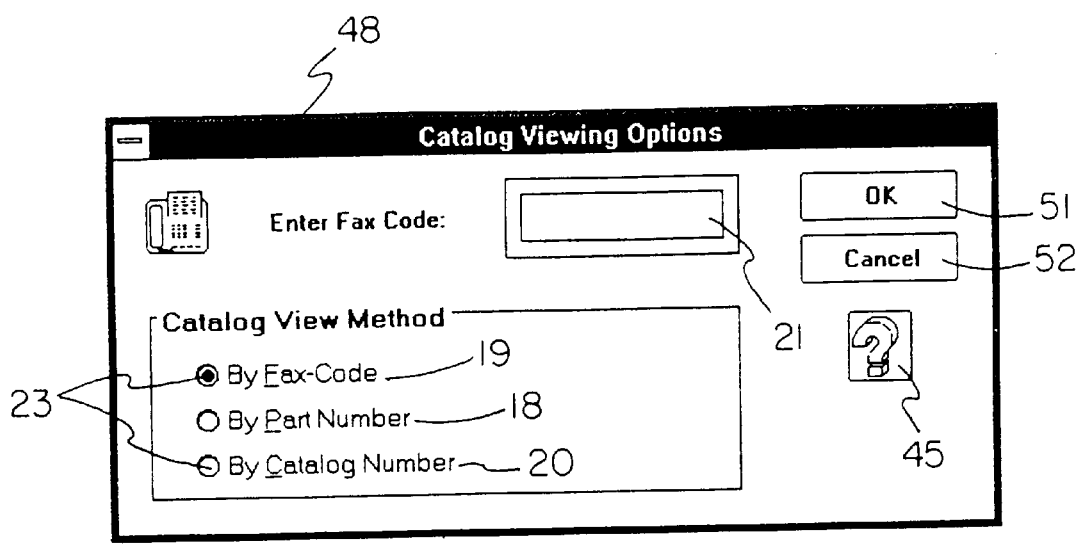
FIG. 4 is a view of a View catalog screen.
Figure 6:
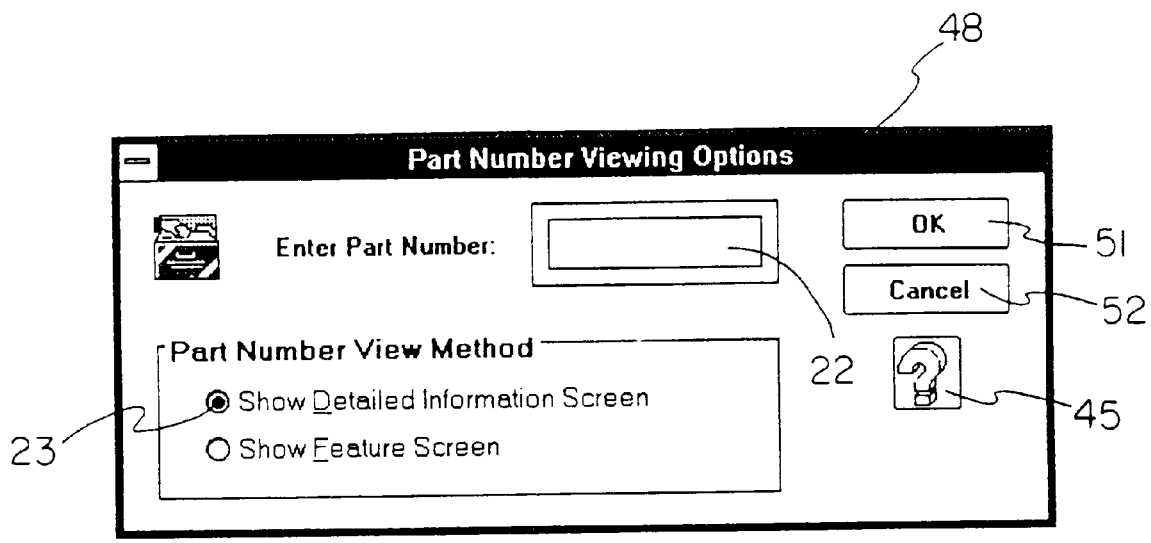
FIG. 6 is a view of a View part number information screen.

The user enters a Picture Search Menu via either the picture search pick 42 from the Main Menu 40 or by selecting an alphabetical entry 16 from the Alphabetical Search Menu 41 that requires further delineation before identifying a single family of items 1. A picture search provides to the user a display of a series of pictures 17, each picture 17 representing either a family cluster 4 or a family of items 1 that are available to be searched. A series of picture 17 appears on one or more display pages. A page marker 58 indicates the current page and the total number of pages in the display. Prior screen pushbutton 201 returns the user to the prior screen. Home pushbutton 202 returns the user to the Main Menu 40. Help pushbutton 203 provides help text for the picture screen. The user, via a mouse or other pointing device, moves an interactive pointer 39 from picture to picture 17. As the pointer 39 passes over each picture 17, a picture subtitle 48a, indicating the name of the family 1 or cluster of families 4 represented by the picture 17, changes accordingly. The user selects a family 1 or cluster of families 4, by clicking the mouse as the pointer 39 is positioned over the desired representative picture 17. If the selected picture represents a family cluster 4, the system branches to a lower level picture search. An example of a second level picture search menu is shown in FIG. 3. In the lower level picture search, the system provides to the user a display of a series of pictures that further delineates the families 1 available within the selected family cluster 4. The user again selects one of the pictures presented and continues in this hierarchial fashion until isolating a selection that represents a single family of items 1. If the selected picture represents a single family 1, the system branches directly to the feature screen 9.

The View Catalog pick 43 provides the user with one of three types of free field entry. The user selects a radio button 23 to identify the nature of a free field entry 21. In a preferred embodiment, the user may select to enter by a part number 18, by a code associated with a part number that is identified by AMP Incorporated as a FaxCode 19, or a catalog number 20. The user enters an identifying number in the free field entry 21. Upon entry, the system electronically displays a catalog page for the identified item. An example of a catalog page is in FIG. 5. Once an item is selected, the system permits the user to branch to a display of tools and other items related to the identified item 3 by selecting the view option 53. A user may choose the zoom option 54 to display the catalog page in a size that is one hundred percent of the original size of the actual paper based catalog page. Zoom is purely a scaling function of the existing screen display. A user may choose the page option 55 to page through electronic displays of catalog pages as one might page through a paper based catalog system.

The Get Part Number Information pick 44 provides the user with a part number entry 22. The user enters a part number indicative of a single item 3. The user selects the radiobutton 23 to choose either a feature screen display or a Detailed Information Screen display for the item entered. If the part number is an item within the data file, the system retrieves the item 3 and identifies the family 1 associated with the part number and branches to the selected screen.

The process up to this point identifies a family 1 of items using conventional hierarchical techniques. Other methods of identifying a family 1 are equally appropriate.

Upon identification of a family 1 to search, the system provides to the user the feature screen 9. Identification of a subfamily or item is processed from the same feature screen 9. The minimum computing system required to run the process disclosed hereinafter has an Intel 80386 microprocessor or compatible upgrade with 4 MBytes of RAM memory, MS DOS revision 6.0 or compatible upgrade, Microsoft Windows revision 3.1 or compatible upgrade, a mouse or other pointing device, a hard disk with 2 MBytes of free disk space, and a Windows compatible CD-ROM drive.

Figure 7:
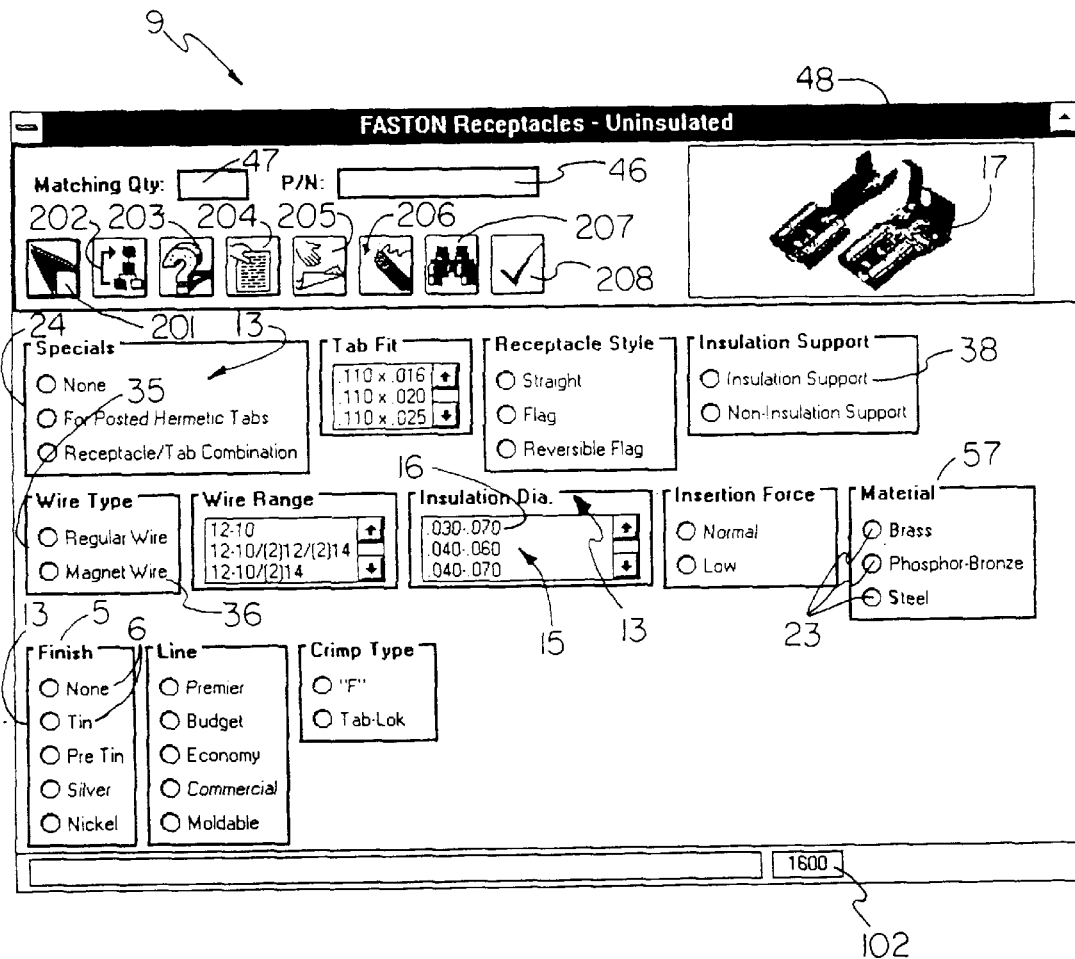
FIG. 7 is a view of a feature screen prior to selections of alternatives having been made by a user.
Figure 8:
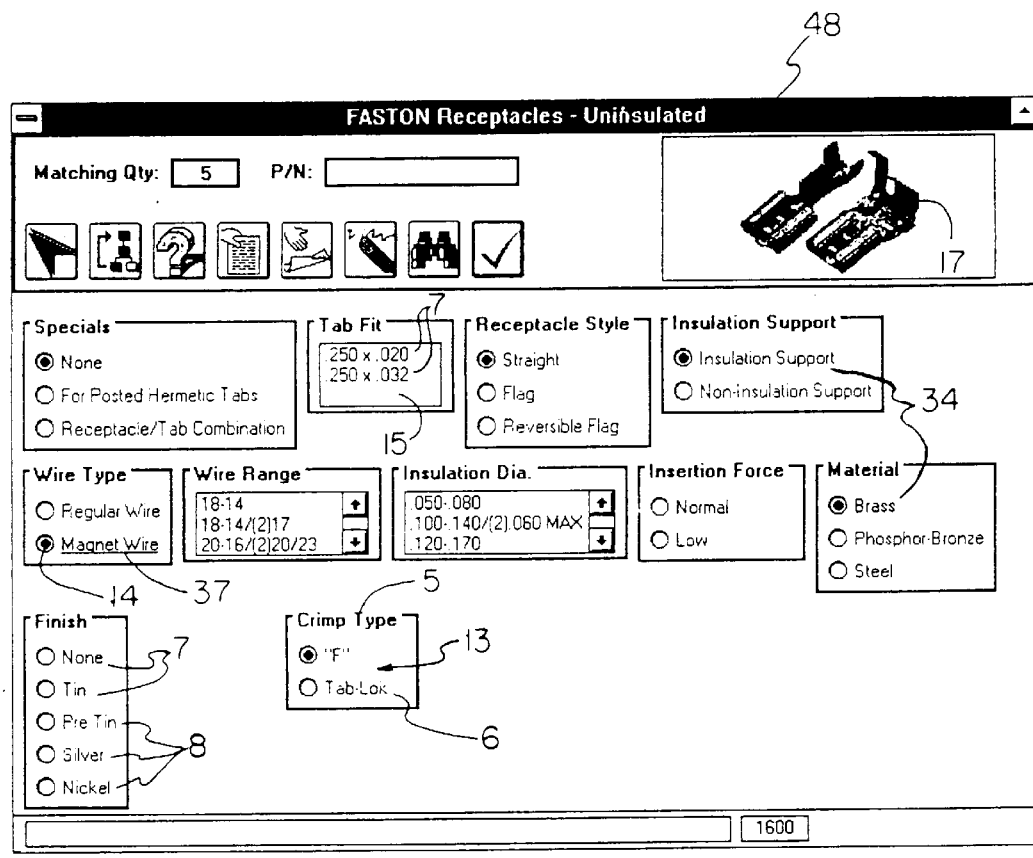
FIG. 8 is a view of a feature screen subsequent to a single selection of an alternative and completion of a search initiated by a user after revision based upon the results of the search.
Figure 9:
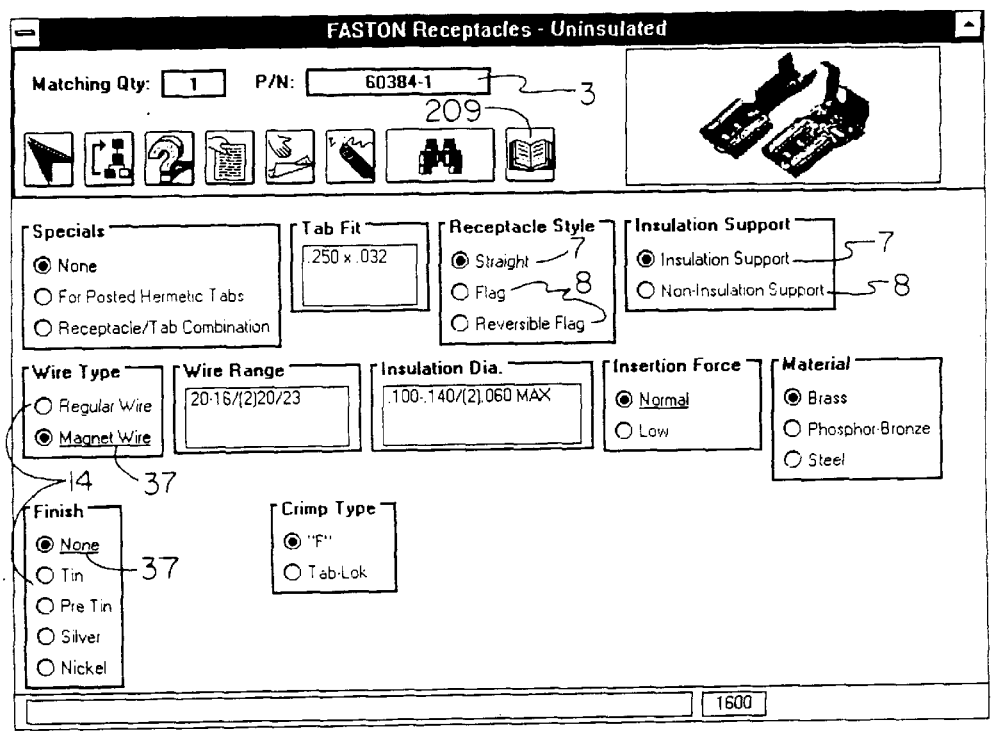
FIG. 9 is a view of a revised feature screen subsequent to a second selection of an alternative from the revised feature screen shown in FIG. 8 and completion of a search initiated by a user after revision based upon the results of the search which has identified a single item.

The feature screen 9, as shown in FIGS. 7 through 9, provides a display of a series of groupings 13 associated with the selected family 1. Each grouping 13 comprises one of the features 5 and a plurality of respective alternatives 6, each feature 5 and respective alternatives being represented within the family 1. Each feature 5 generally describes a category of subject of the respective alternatives 6. The grouping 13 visually relates the feature 5 to its respective alternatives 6 by the proximity of feature 5 to respective alternatives and by a frame 24 enclosing them. Each grouping 13 contains either a plurality of the radiobuttons 23 or one listbox 15. Each alternative 6 has associated therewith, a user selector. The user selector may be in the form of a radiobutton 23 that is white to denote nonselection ("off") and partially filled in black to denote selection ("on"). A user selector may also be in the form of a listbox entry 16 that is in a standard font to denote nonselection ("off") and is in a reverse font to denote selection ("on"). The alternatives 6 may be selected or deselected via the radiobuttons 23 or listbox entries 16 to create selected alternatives 37. The feature screen 9, therefore, provides a guided search in that it presents terminology for the features 5 and the alternatives 6 to the user prior to a search. A screen title 48 appears centered at the top of the display and the representative picture 17 appears in the upper right corner of the display. A matching quantity box 47 and part number identification box 46 appear at the upper left corner of the display.

Positioning the interactive pointer 39 and clicking the mouse once, toggles a radiobutton 23 or listbox entry 16 to select ("on") or deselect ("off") an alternative 6. While in the feature screen 9, the user may select and deselect turning radiobuttons 23 and listbox entries 16 "on" and "off" as desired. In response to a user initiated signal to perform a search, the system retrieves information concerning which user selectors 16, 23 are turned "on" and to which alternatives 6 the user selectors 16, 23 that are turned "on" relate. The alternatives 6 turned "on" are the selected alternatives 37 and constitute the selection criteria 14 used in the search to generate a subfamily 2. In a preferred embodiment of the system, a double mouse click on a user selector 23 or 16 that is turned "off") selects the alternative 6 and then performs a search using the selection criteria 14.

A series of pushbuttons 201 through 208 are positioned below the matching quantity box 47 and part number identification box 46. Actuation of any one of the pushbuttons 201 through 208 via a mouse click performs a different system function. The prior screen pushbutton 201 returns the user to the prior screen. The home pushbutton 202 returns the user to the Main Menu 40. Help pushbutton 203 provides the user with help information concerning the current screen. Criteria hold pushbutton 204 "holds" or memorizes the current selection criteria 14 for later use. Criteria apply pushbutton 205 "applies" the selection criteria 14 most recently "held" using the criteria hold pushbutton 204. Advantageously, a selection criteria 14 "held" while working with one family may be "applied" while working with a different family.

Figure 10:
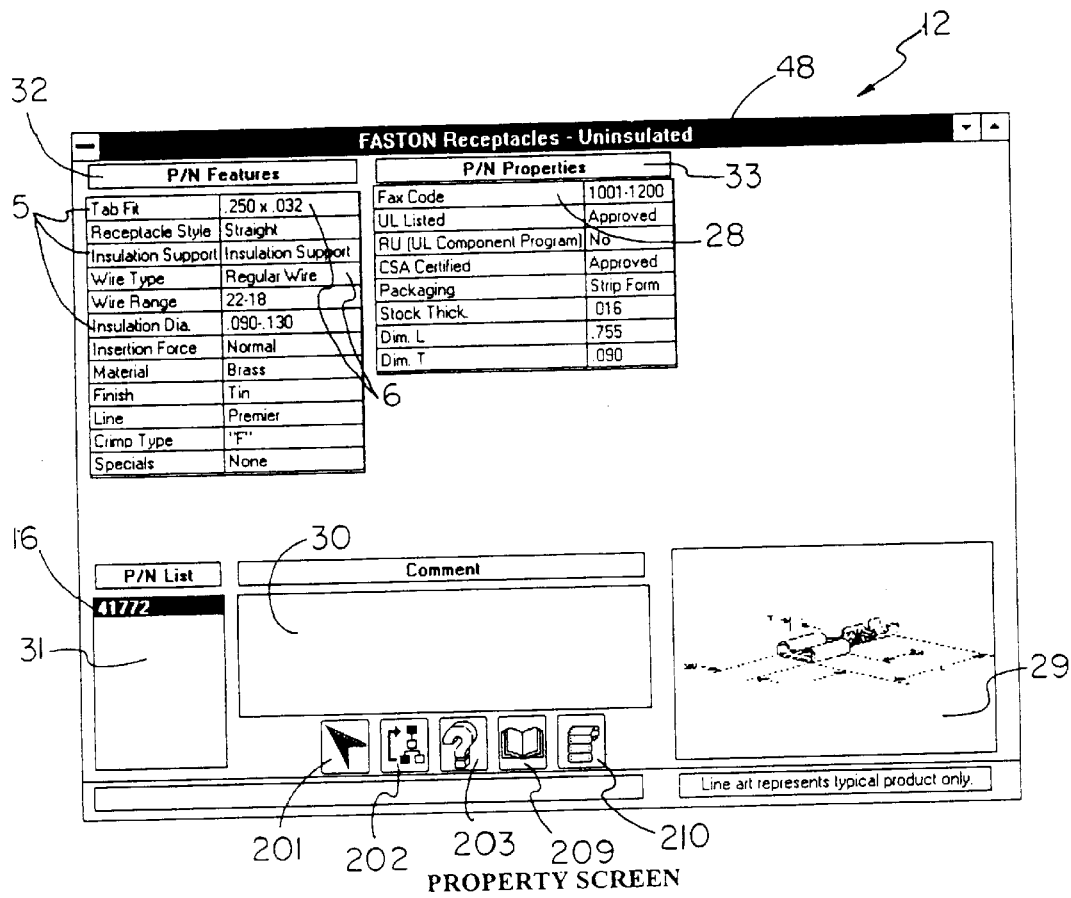
FIG. 10 is a view of a Property screen for the item identified in the feature screen in FIG. 9.

Erasure pushbutton 206 resets all currently selected alternatives 37. Detail view pushbutton 207 displays a property screen 12. An example of the property screen 12 is shown in FIG. 10. Search pushbutton 208 performs a search according to the selection criteria 14.

When the user initiates a search via the search pushbutton 208 or a double mouse click, the system gathers the selection criteria 14 from the user selectors 16, 23 that are toggled "on", indicating the selected alternatives 37. Using the selection criteria 14, the system searches the family 1 for items 3 that satisfy the selection criteria 14. A result of the search is a subfamily 2 of items, each item 3 within the subfamily 2 having alternatives 6 that match the selection criteria 14. The system then searches the subfamily 2 to identify those alternatives 6 that remain available for further selection, available alternatives 7, and those alternatives 6 that are available within the family 1, but are mutually exclusive with the selection criteria 14 that generated the subfamily 2, unavailable alternatives 8.

Based on the available alternatives 7, the system revises the feature screen 9. A feature screen revised accordingly is shown in FIG. 8. In FIG. 8, the feature screen of FIG. 7 is revised after selection of alternative 6 "Magnet Wire" in the grouping associated with the feature 5 "Wire Type". Each selected alternative 37 is displayed in a bold font and underlined. Each available alternative 7 within the subfamily 2 is displayed in a bold font and is not underlined. The radiobutton 23 for each selected alternative 37 and each available alternative 7 is enabled, meaning that they may be toggled in order to modify the current selection criteria 14. An exception exists if one of the groupings 13 comprises only one available alternative 7. In that case, the available alternative 7 is a forced alternative 34 and is turned "on", and the associated radiobutton 23 is disabled meaning it may not be deselected. A forced alternative 34 indicates that for the selection criteria 14, all items necessarily have the forced alternative 34, and that there is no item satisfying the selection criteria 14 without the forced alternative 34. In FIG. 8, an example of a "forced" alternative is "None" in the "Specials" grouping 13. This indicates that for all items 3 having "Magnet Wire" as a "Wire Type" there are no other "Specials" alternatives 6 other than "None". Each unavailable alternative 8 within the subfamily 2 is displayed on the feature screen 9 and within the grouping 13, but is displayed in a grey shaded font. A radiobutton 23 associated with each unavailable alternative 8 is disabled. In the case of a grouping 13 that comprises one of the listboxes 15, only available alternatives 7 are listed as listbox entries 16. The feature screen 9 also displays the quantity of items in the subfamily 2 in a matching quantity box 47.

After the feature screen is revised, the user may choose to modify the selection criteria 14 by selecting one or more available alternatives 7 or deselecting a selected alternative 37. Unavailable alternatives 8 may not be selected to modify the selection criteria 14 as their associated radiobuttons 23 are disabled. Similarly, forced alternatives 34 may not be deselected. This impairs the user's ability to select mutually exclusive alternatives 6.

The user may select one or more available alternatives 7 and then initiate a search by clicking twice or using the search pushbutton 208. The system performs an identical search to the one disclosed hereinabove and revises the feature screen accordingly. By virtue of the fact that selected alternatives 37 are added to the selection criteria 14, the subfamily 2 that satisfies the selection criteria 14 necessarily has fewer items 3. A search and revision of the feature screen 9 after each selected alternative 37 provides to the user an indication of how selection of one alternative affects the availability of remaining alternatives 6. Presentation of the affect of selected alternatives guides the user in selecting appropriate alternatives 6 according to the user's priorities. Iterative selections, searches, and revisions progressively narrows the subfamily 2 to isolate and identify a manageable number of items according to user priorities. A narrowing of the subfamily 2 from the feature screen 9 shown in FIG. 8 is shown in FIG. 9 and identifies a single item 3.

If the user has turned more than one user selector "on" prior to processing a search, it is conceivable that the selection criteria 14 contains mutually exclusive alternatives and will produce a subfamily 2 containing zero items 3. In the event of a zero item subfamily 2, an embodiment of the system indicates that no items are identified, and returns the user to the feature screen prior to initiating a search. As a zero item subfamily situation is considered undesirable, when there are no items in a subfamily 2, in a preferred embodiment the system will deselect a most recently selected alternative 37 and perform the search with a revised selection criteria 14. The deselection process will iterate, automatically deselecting the most recently selected alternative until there is at least one item 3 in the subfamily 2. Sequential deselection will provide a prioritized approach of automatically revising the selection criteria 14 and guaranteeing identification of at least one item for every search initiated. Automated deselection is based on the assumption that the alternative selected first in time is the highest priority in the selection criteria 14, with subsequent selections of alternatives 6 having descending priority to the user.

The user may also modify the selection criteria 14 by deselecting one of the selected alternatives 37. Deselecting is accomplished by clicking the mouse once with the mouse pointer on one of the selected alternatives 37 to toggle the associated radiobutton 23 "off". User deselection of one of the selected alternatives 37 not part of the selection criteria 14 simply toggles the associated radiobutton 23 to "OFF". User deselection of one of the selected alternatives 37 that was part of the selection criteria 14 toggles the associated radiobutton 23 to "OFF" and, automatically initiates a search process to update the subfamily 2 and revise the feature screen 9 accordingly. User deselection and search is particularly helpful after identifying a family 1 via the Get Part Number Information Pick 44. Using the Get Part Number Information Menu and user deselection, the user, starting with a single part, may easily find a similar item by deselecting one or more of the selected alternatives 37.

In certain cases, a grouping 13 logically applies only if an alternative from a different grouping is selected. In this case, selection of a trigger alternative (not shown) within one grouping, will give rise to available alternatives 7 in a dependant grouping (not shown). Selection of one of the alternatives 6 in the dependant grouping will further refine the trigger alternative selection. With respect to cars for example, one grouping may be "transmission style" having "automatic transmission" and "manual transmission" as alternatives 6. The trigger alternative, "manual transmission", will give rise to the dependant grouping, "number of speeds" having alternatives 6 "three speed", "four speed", and "five speed". The alternatives 6 in the dependant grouping are not applicable to the users selection criteria 14 unless the trigger alternative is selected. In a preferred embodiment, therefore, the dependant grouping will not be displayed until selection the trigger alternative. Although this is part of a preferred embodiment, it is not included in the source code disclosed herein.

Alternatively, in a less preferred embodiment, all of the groupings 13 for a feature screen are initially displayed. If, as a result of a search and for a subfamily 2, all of the alternatives 6 within one of the groupings 13 are unavailable alternatives 8, the grouping 13 is hidden and is not displayed. An example of a hidden grouping is illustrated in FIGS. 7 and 8 wherein the "Line" feature has no available alternatives 7 for the selection criteria 14 comprising "Magnet Wire".

At any point in the feature screen 9, a user may select the detail view pushbutton 207 to branch to the property screen 12. An example of the property screen 12 is shown in FIG. 10. The property screen 12 displays the feature 5 and specific alternatives for a single item 3 in a tabular format, a feature table 32. The property screen 12 further displays additional properties 28 associated with the item 3 in a tabular format a property table 33. Also displayed is a picture display of a line art 29 associated with the item 3, a comment area 30 and a subfamily part number list 31. A user may select any one of the part number entries 16 in the subfamily part number listbox 31 for display in the property screen 12.

Figure 5:
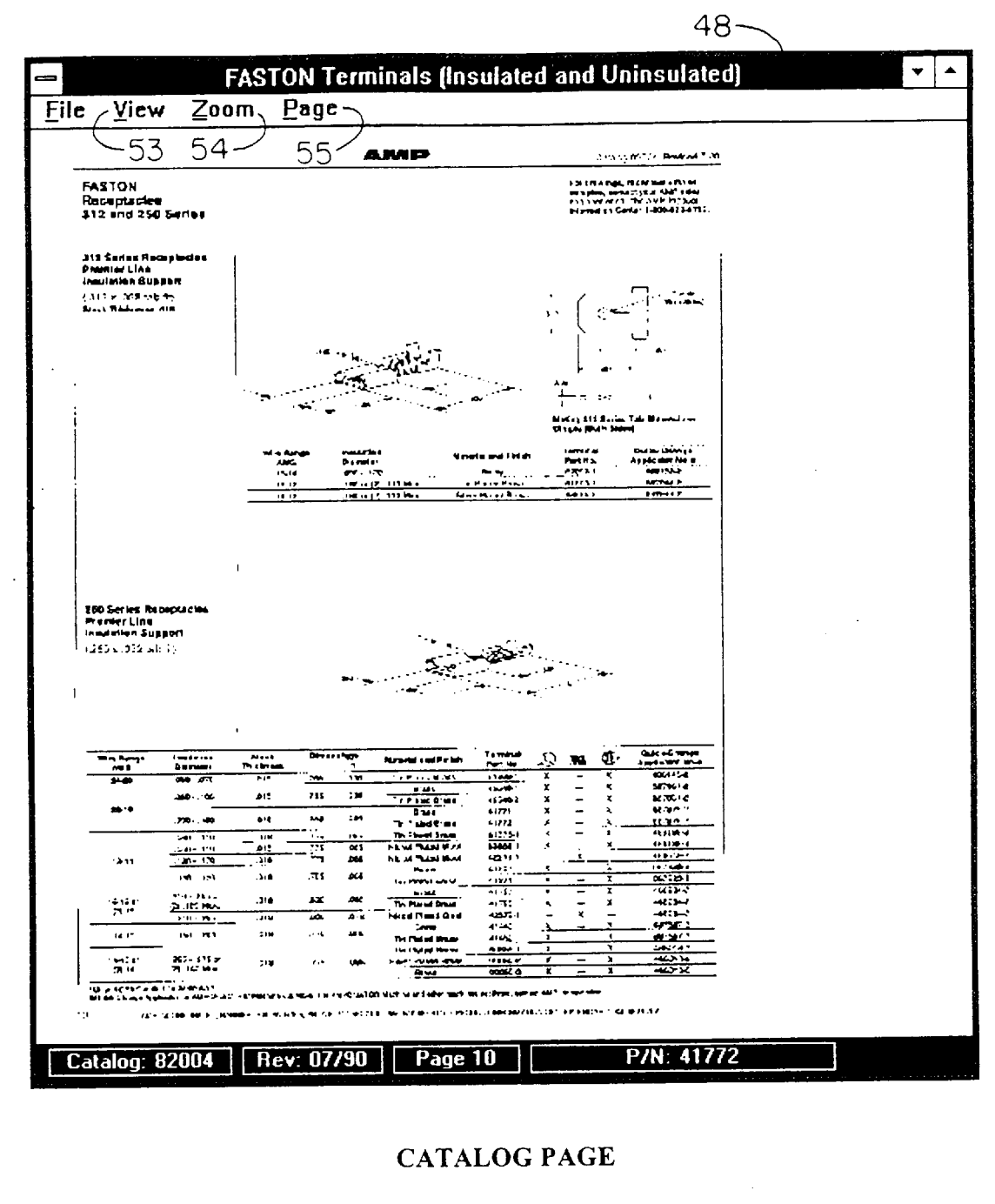

The prior screen pushbutton 201, home pushbutton 202, and help pushbutton 203 are available from the property screen 12. View catalog pushbutton 209 branches the user to a screen with a representation of a catalog page for the item identified. In the embodiment of an electronic catalog for electrical connectors, the view catalog pushbutton 209 branches to the screen an example of which is shown in FIG. 5. Print pushbutton 210 prints out the property screen 12.

The feature screen 9 and the processing associated therewith is a piece of an overall electronic catalog system which includes additional operations such as the Alphabetical search, Picture search, View Catalog, and Get Part Number Information. Only those datafiles and operations associated with the feature screen 9 and property screen 12 will be described hereinafter.

A Database Organization Datafile 60 defines the features 5 used in each unique feature screen 9 and the features 5 and properties 28 used in each unique property screen 12. A graphical representation of records in the Database Organization Datafile 60 is shown in FIG. 11. Each record in the Database Organization Datafile 60 defines a set of features or properties and has seventeen fields: screen type 601, screen 602, and feature one through feature fifteen 603. The screen type field 601 contains a value of "F" if the record defines features 5 and a value of "P" if the record defines properties 28. The screen field 602 contains a numerical value that represents each feature screen 9 or Property screen 12. If the screen type field 601 contains a value of "F", the feature one field 603 through feature fifteen field 603 each contains a value that represents one unique feature 5 associated with one of the groupings 13 on the feature screen 9. If the screen type field 601 contains a value of "P", the feature one field 603 through feature fifteen field 603 each contains a value representing one of the properties 28 to be listed on the property screen 12. The property screen 12 also uses the information in the record defining the feature screen 9 having the same value in the screen field 602 to display features 5 in the feature table 32. There are fifteen feature fields 603 per record. The feature screen 9, therefore, may contain up to fifteen features 5 and the property screen 12 may contain up to fifteen features 5 in the feature table 32 and up to fifteen properties 28 in the property table 33. If one or more of the feature fields 603 is blank, then the feature screen 9 or property screen 12 represented by the record will contain a number of groupings 13 less than fifteen and a property screen represented by the record will have fewer than 15 features in the feature table 32 and/or fewer than fifteen properties in the property table 33.

Figure 12:
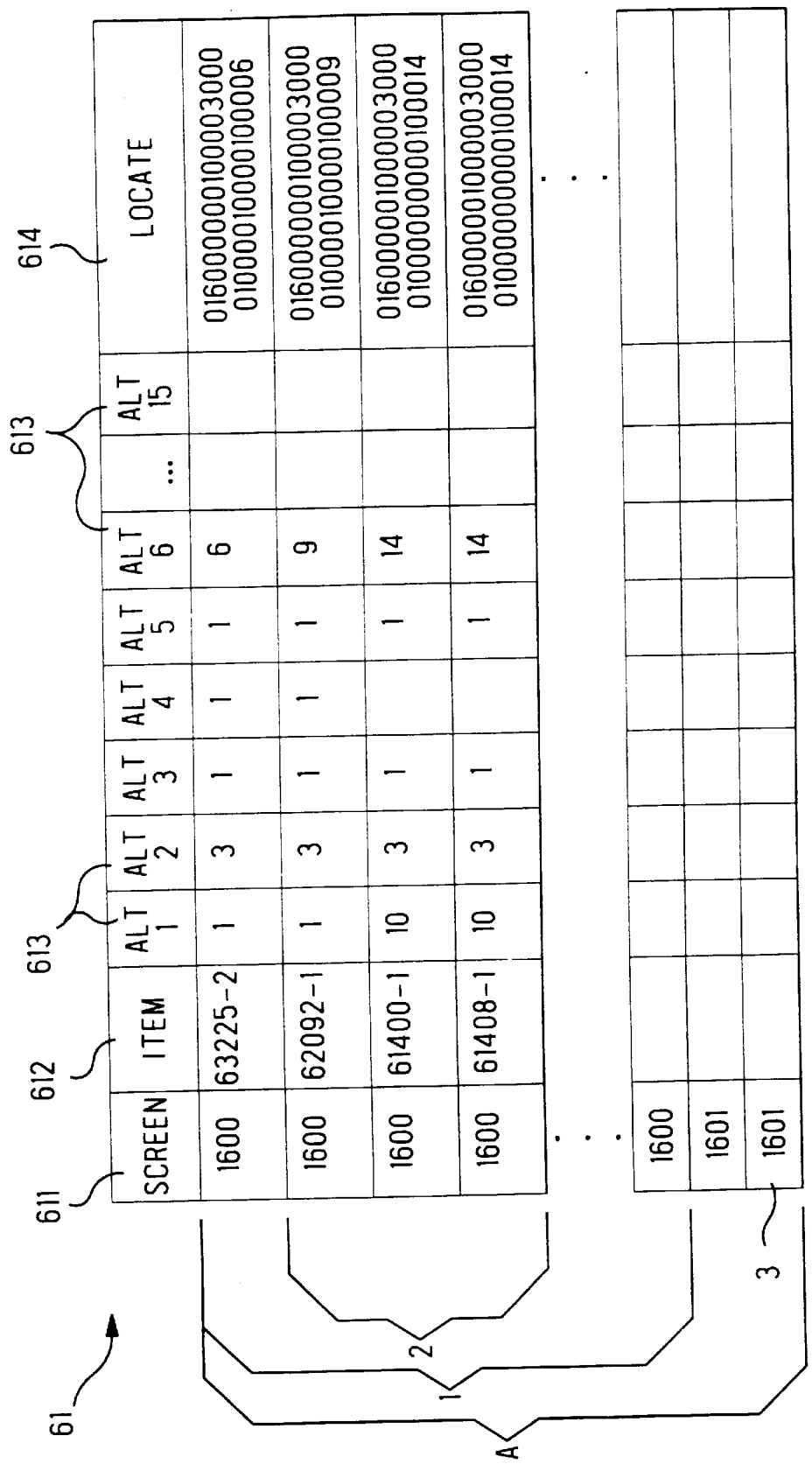
FIG. 12 is a graphical representation of the Part Number Features Datafile and example data records therein.

A Part Number Features Datafile 61 indicates the alternatives 6 for each feature 5 represented by an item 3. A graphical representation of records in the Part Number Features Datafile 61 is shown in FIG. 12. Each record in the Part Number Features Datafile 61 has eighteen fields: screen 611, item 612, alternative one 613 through alternative fifteen 613, and locate 614. The Part Number Features Datafile screen field 611 contains a value representing one feature screen 9. All records within the Part Number Features Datafile 61 having the same value in the screen field 611 constitute a family of items 1. The value contained within the Part Number Features Datafile screen field 611 is used to cross reference to the Database Organization Datafile 62 screen field 602 having the same value and having a screen type field 601 containing a value of "F" for feature screen type. The feature one through feature fifteen fields 603 of the Database Organization Datafile 60 correspond directly to alternative one through alternative fifteen fields 613 in the Part Number Features Datafile 61. The item field 612 contains a part number that represents a single item 3 in a family 1. The alternative one field 613 through alternative fifteen field 613 each contain a value representing one alternative 6 that is associated with the item 3 represented by one record. Each item 3 may be defined by up to fifteen alternatives 6. If any of the alternative one 613 through alternative fifteen fields 613 does not contain a value, then the field is unused and the alternative does not apply to the item. The locate field 614 contains a duplicate representation of the values contained in the feature screen field 611 and the alternative one through alternative fifteen fields 613, in a single field.

In order to determine which alternatives 6 relate to each item 3, cross reference is made between the Database Organization Datafile 60 and the Part Number Features Datafile 61. Each record in the Part Number Features Datafiles 61, defines one item 3. Associated with the item, by virtue of being contained in the same record, is a value contained within the screen field 611. Cross reference is made to the Database Organization Datafile 60 screen field 602 having the same value as the Part Number Features Datafiles 61 screen field 611 value and a screen type 601 value of "F". Values in the feature one 603 through feature fifteen fields 603 correspond to values in the alternative one 613 through alternative fifteen fields 613 to define which alternative 6 within each of the up to fifteen defined features 5 is represented by the item 3. In this way, therefore, each item 3 is defined as comprising a characteristic set of alternatives 6.

The Feature Screen Group Datafile 62 defines a profile of each feature screen 9 and the groupings 13 contained therein. A graphical representation of records in the feature screen Group Datafile 62 is shown in FIG. 13. Each record of the feature screen Group Datafile 62 has four fields: a screen 621, a grouping sequence 622, selection type 623, and feature 624. The screen field 621 contains a value representing one feature screen. This number represents the same feature screen as is represented in all data files having a screen field 602, 611, 621, 631, 692, 661, 671 and is used for cross referencing purposes. The feature field 624 contains a unique number associated with one feature 5 and the grouping sequence field 622 contains a value representing a placement sequence of the grouping 13 on the feature screen 9. The selection type field 623 contains a value of "R" if alternatives 6 associated with the grouping 13 are selected via radio buttons 23 or a value of "L" if alternatives associated with the grouping 13 are selected via listbox entries 16. Although not implemented in a preferred embodiment, alternatives 6 may also be selected via a checklist (not shown), in which case the selection type field 623 will have a value of "C".

The feature screen Description Datafile 63 defines the profile of the alternatives 6 for each feature 5 for a particular feature screen 9. A graphical representation of records in the feature screen Description Datafile 63 is shown in FIG. 14. Each record of the feature screen Description Datafile 63 has four fields: screen 631, feature 632, alternative sequence 633, and alternative 634. The screen field 631 and feature field 632 contain values representing one feature screen 9 and feature 6 respectively similar to those found in the feature screen Group Datafile 62 screen field 621 and feature field 624. The alternative field 634 contains a value representing an alternative 6 of the feature 5 specified in feature field 632. The alternative sequence field 633 represents the sequential position of the alternative 6 listed in alternative field 634 if the grouping 632 has a selection type 623 of radio button, "R", or checklist "C".

Figure 15:
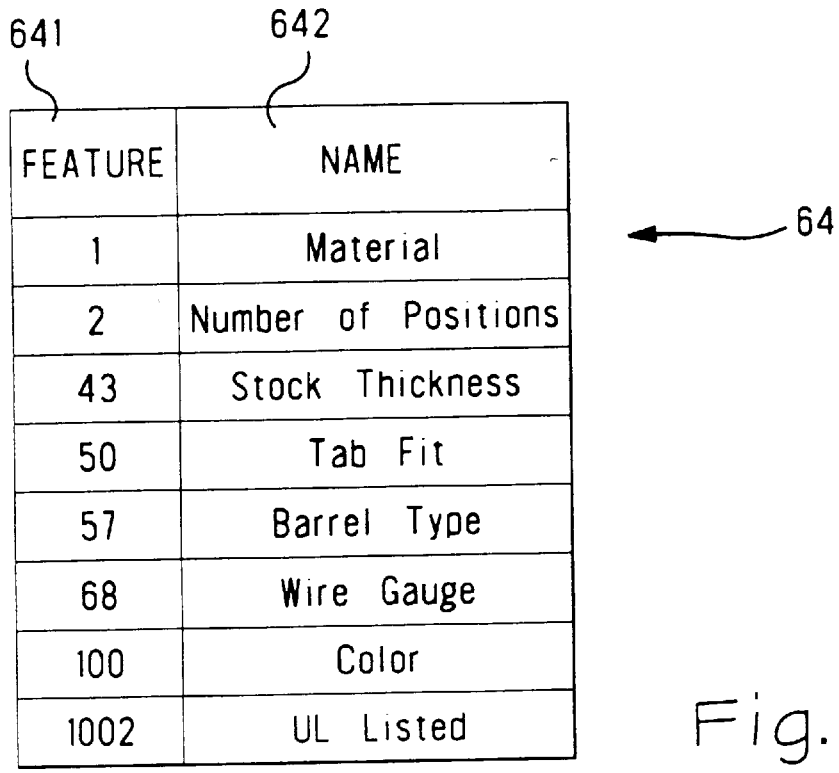
FIG. 15 is a graphical representation of the Feature Name Datafile and example data records therein.

The Feature Name Datafile 64 cross references an alphanumeric name for each feature 5. A graphical representation of records in the Feature Name Datafile 64 is shown in FIG. 15. Each record has two fields: feature 641 and name 642.

Figure 16:
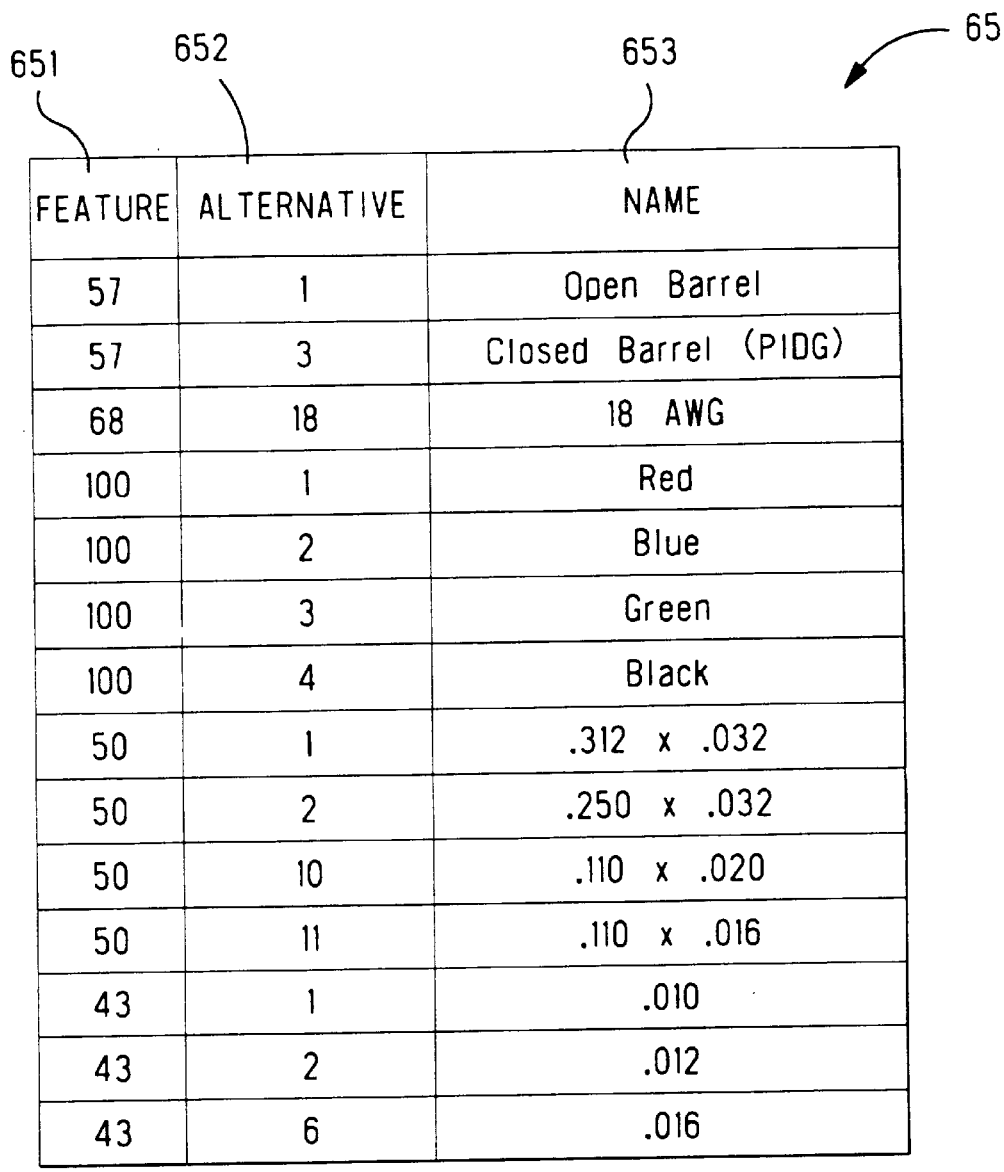
FIG. 16 is a graphical representation of the Feature Value Datafile and example data records therein.

The Feature Value Datafile 65 cross references numbers representing features 5 and alternatives 6 with an alphanumeric name. A graphical representation of records in the Feature Value Datafile 65 is shown in FIG. 16. Each record in the Feature Value Datafile 65 has three fields: feature 651, alternative 652, and name 653. The system uses the value in the name field 653 to appropriately caption alternatives 6 within the groupings 13 on the feature screen 9.

Figure 17:
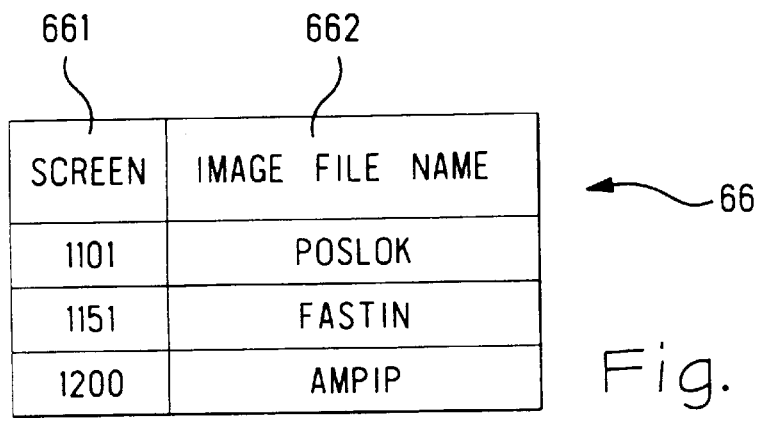
FIG. 17 is a graphical representation of the feature screen Image Datafile and example data records therein.

The feature screen Image Datafile 66 defines an image file name of the picture 17 that is displayed in the upper right hand corner of the feature screen 9. A graphical representation of records in the feature screen Image Datafile 66 is shown in FIG. 17. Each record in the feature screen Image Datafile 66 has two fields: a screen 661 and an image file name 662. The value contained within the screen field 661 specifies the feature screen 9. The value contained within the image file name field 662 is the name of a data file from which the system may retrieve a bitmapped representation of the representative picture 17 associated with the family of items 1 being searched in the specified feature screen 9.

A Part Number Properties Datafile 67 indicates the alternatives 6 represented for each item 3 for use with the Property Screen 12. A graphical representation of records in the Part Number Properties Datafile 67 is shown in FIG. 18. Each record in the Part Number Properties Datafile 67 has seventeen fields; screen 671, item 672, and alternatives one 673 through alternative fifteen 673. The Part Number Properties Datafile screen field 671 contains a value representing one property screen 12. The value contained within the Part Number Properties Datafile screen field 671 is used to cross reference to the Database Organization Datafile 60 screen field 602 having the same value and having a screen type field 601 containing a value of "P" for property screen. The item field 672 contains a part number that represents a single item 3. The alternative one field 673, alternative two field 673 through alternative fifteen field 673 each contain a value representing a single alternative 6 that is associated with the item 3 represented by one record. One item 3 is defined by up to fifteen alternatives. If any of the alternative one through alternative fifteen fields 673 does not contain a value, then the field is unused and the alternative does not apply.

An Extra Properties Datafile 68 defines additional characteristics for each item 3 for display in the Property Screen 12. A graphical representation of records in the Extra Properties Datafile 68 is shown in FIG. 19. The additional characteristics do not represent alternatives and may not be searched, they are, however, displayed in the comment area 30 on the Property screen 12 as additional item information.

Each record has three fields; item 681, comment 682, and image 683. The item field 681 contains a number representing one item 3.

Figure 20:
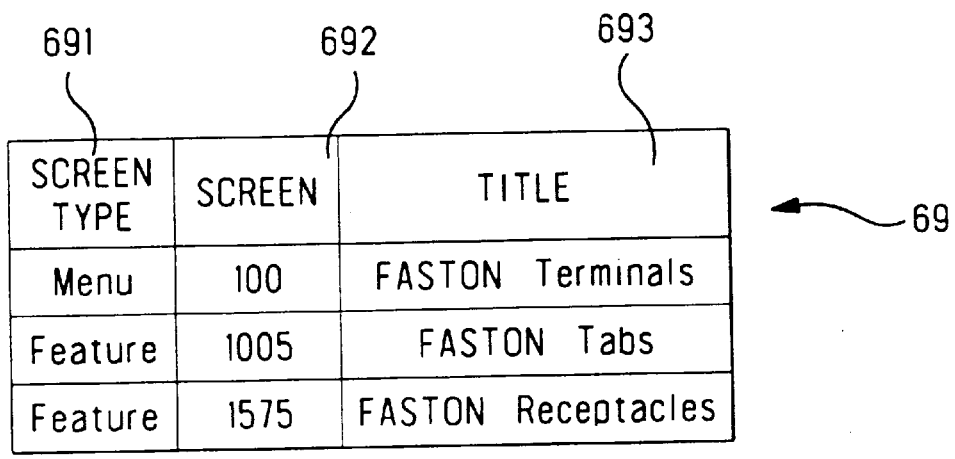
FIG. 20 is a graphical representation of the Screen Title Datafile and example data records therein.

The Screen Title Datafile 69 cross references the screen number and screen type with an alphanumeric string. A graphical representation of records in the Screen Title Datafile 69 is shown in FIG. 20. Each record in the Screen Title Datafile 69 has three fields: screen type 691, screen 692, and title 693. The system uses the value in the title field 693 to appropriately label Screens with the identifying title 48 at the top of all system screens.

The minimum system requirements for development of software to implement the process herein disclosed includes all hardware required for the system to use the software as well as Microsoft Visual Basic 3.0 Professional Edition and Accusoft Image Library VBX.

There are three program level files associated with the feature screen; FEATURES.FRM, GLOBAL.BAS, DATA.BAS, and PROPERTI.FRM. The PROPERTI.FRM is used to process property screen forms. FEATURES.FRM contains variable declarations and subroutines used to process feature screen forms. GLOBAL.BAS contains variable declarations global to the entire electronic catalog application software. DATA.BAS contains subroutines, global to the entire application software, that are executed by FEATURES.FRM, PROPERTI.FRM as well as other application forms. There are three main operations executed by FEATURES.FRM; feature screen Creation, Search, and feature screen Revision. Central to all three operations is a FrameInfo data array having one to fifteen elements.

GLOBAL.BAS defines the global variable FrameInfo having a data structure of FrameInfoType. FrameInfoType is also defined in GLOBAL.BAS. In a preferred embodiment, the FrameInfoType data structure includes; Feature, Type, CurSelection, DBColumn, DBFeatureNum, RBFeatVal array from 0 to 7 elements, RBStatus array from 0 to 7 elements, SelectionOrder and NotApplicable, and is initialized to zero at the start of the feature screen operation. The executable code for the feature screen also uses a form, FRM 101, which is defined off line using the Visual Basic software tool. FRM 101 defines, among other things, an interactive screen having fifteen frames and all relevant pushbuttons 25, each frame 24 containing eight radiobuttons 23 and a listbox 15. FRM 101 is a general and consistent screen structure adapted by FrameInfo data to display a particular feature screen 9.

After identifying a particular family of items 1 to search using the Alphabetical Search, the Picture Search, the Get Part Number Information, or other identification system, the system uses FEATURES.FRM passing to it a global variable ScreenNum 102. ScreenNum 102 indicates a numerical code for the appropriate feature screen 9 and is associated with one family of items 1 to be searched. ScreenNum 102 is the value contained in the screen fields 602, 611, 621, 631, 661, 671 and 692 associated with a particular feature screen 9.

Figure 21:
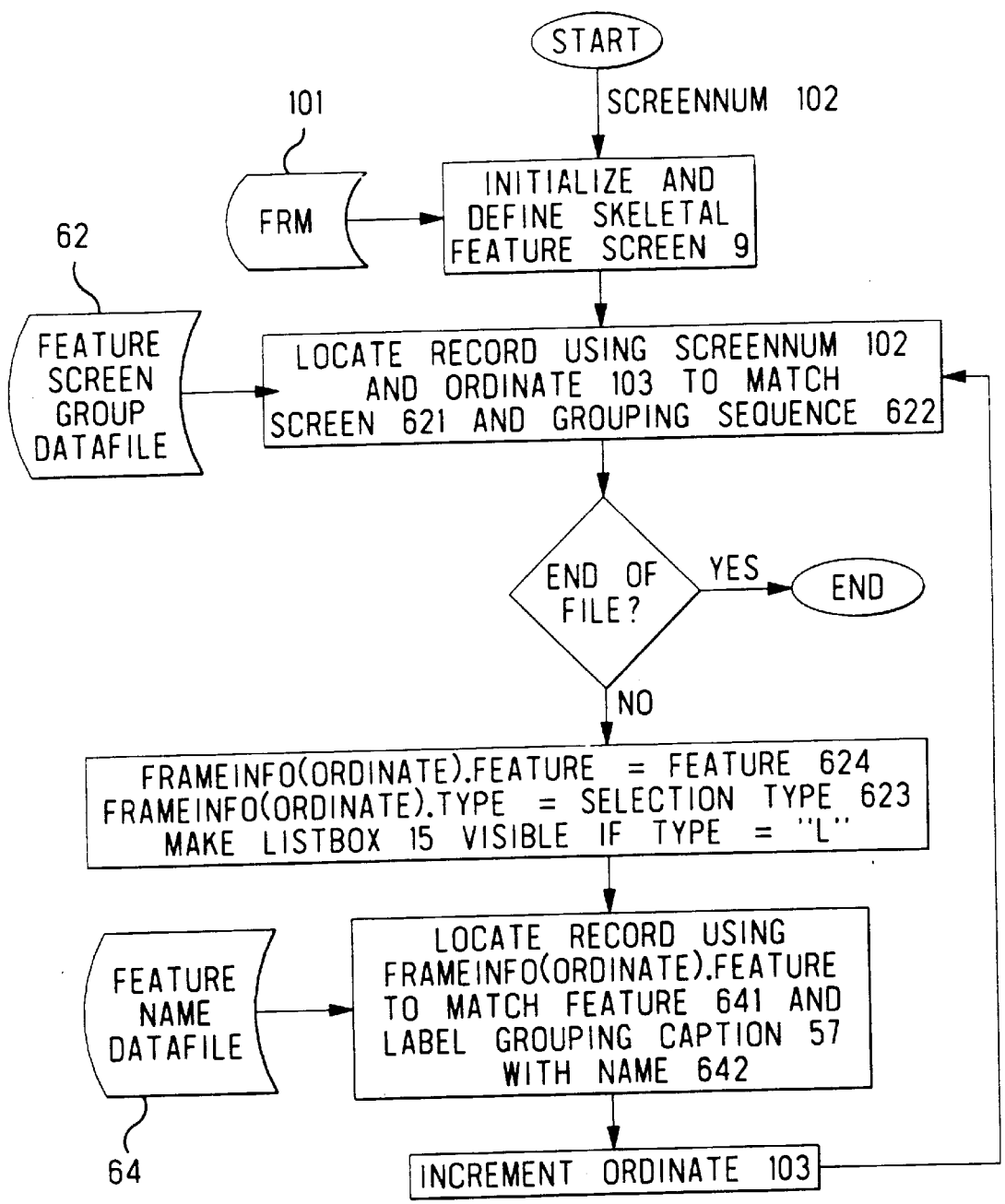
FIG. 21 is a graphical representation of the program flow of an embodiment of the feature screen creation operation labeling the groupings for a unique feature screen.

The feature screen creation operation comprises an iterative loop that loads the FrameInfo data array in proper sequential grouping order with the appropriate data. A graphical representation of an embodiment of the feature screen creation operation flow to provide the grouping captions 57 is shown in FIG. 21. A loop repeats for each grouping 13 defined for the feature screen 9 incrementing an ordinate 103 for each iteration. The number of groupings 13 and hence the number of iterations of the loop is up to fifteen in a preferred embodiment, although the system does not preclude modification of this number. For each sequential grouping 13, the system accesses the feature screen Group Datafile 62 to locate the record having a value in the screen field 621 and grouping sequence field 622 equal to Screen-Num 102 and the current FrameInfo ordinate 103 respectively. For the record located, FrameInfo(ordinate).Type is set equal to the value in the selection type field 623 and FrameInfo(ordinate).Feature is set equal to the value in the feature field 624. If FrameInfo(ordinate).Type is equal to "L", then the listbox 15 for the grouping 13 identified in the grouping sequence field 622 is made visible. In a preferred embodiment, if there are more than eight alternatives 6 associated with one of the groupings 13, the grouping 13 comprises a listbox 15. The system uses the value in FrameInfo(ordinate).Feature to cross reference the Feature Name Datafile 64 and locates the record having the same value in the feature field 641. The caption 57 of the grouping 13 is set equal to the string value in the name field 642 of the record. The above operation continues, the result of which is to provide the caption 57 or name, representing a feature 5, for each grouping 13 on the feature screen 9.

Figure 22:
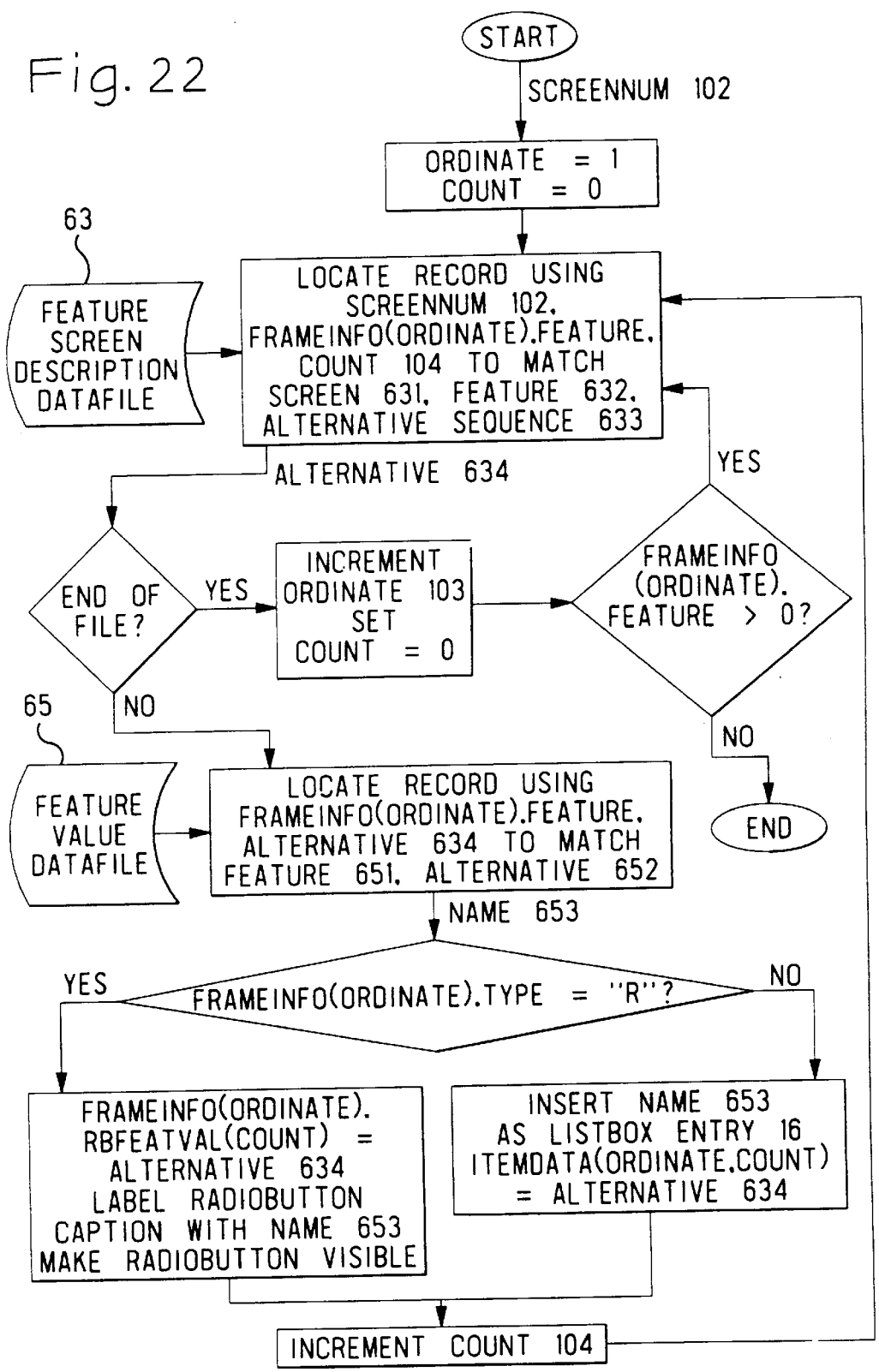
FIG. 22 is a graphical representation of the program flow of an embodiment of the feature screen creation operation labeling the alternatives.

The feature screen creation operation further comprises interating a FrameInfo ordinate 103 from one to as many groupings 13 that exist for the feature screen 9. A graphical representation of an embodiment of the feature screen creation operation program flow labeling the alternatives 6 is shown in FIG. 22. A nested operation iterates a count 104 corresponding to the number of alternatives 6 within the grouping 13 from zero to as many records as are found. When no matching records are found, the count is reset to zero, and the ordinate increments. The system uses Screen-Num 102, FrameInfo(ordinate).Feature, and count 104 plus one to cross reference the feature screen Description Datafile 63 and locate the record having matching values in the screen field 631, feature field 632, and alternative sequence field 633 respectively. The system uses FrameInfo(ordinate) .Feature and alternative field 634 in the matching record in the feature screen Description Datafile 63 to cross reference the Feature Value Datafile 65 and locate a record having a match with the feature 651 and alternative 652 fields respectively. The name field 653 of the located record is used to label the respective alternative 6.

If FrameInfo(ordinate).Type is equal to "R", meaning that the grouping 13 is a set of radiobuttons 23, FrameInfo (ordinate).RBFeatVal(count) is set equal to the value in the alternative field 634 of the matching record in the feature screen Description Datafile 63. The radiobutton 23 is labeled with the string value in the name field 653 of the matching record in the Feature Value Datafile 65.

If the FrameInfo(ordinate).Type has a value of "L", meaning that the grouping 13 is a listbox 15, the same cross referencing and locating a matching record in the feature screen Description Datafile 63 and the Feature Value Datafile 65 as in the case of the radiobutton 23 described hereinabove applies. In the case of a listbox 15, however, the Visual Basic system organizes listbox entries 16 alphabetically. The string value in the name field 653 is inserted as a listbox entry 16 for the grouping 13. The value in the alternative field 634 is stored in an ItemData array (not shown) associated with the listbox 15. The ItemData array is inherent to Microsoft Windows and is part of a conventional listbox definition and building operation of Visual Basic. The result of the operation is properly captioned alternatives 6, as either radiobuttons 23 or listbox entries 16 for each grouping 13 used in the feature screen 9. In a preferred embodiment, if there are more than 8 alternatives 6 for one of the feature 5 in the family 1, the grouping 13 comprises a listbox. This particular distinction between the appropriate grouping style is a matter of design choice. When the grouping 13 and alternative 6 captions are set, the system adjusts the size of frames surrounding each grouping 13 to aesthetically pleasing proportions and adjacent spacings.

The feature screen creation operation further comprises identifying, for each grouping 13, the column position of a corresponding feature 5 in the Database Organization Datafile 60. The column position is stored into FrameInfo.DBColumn. The program flow of this operation is not shown in the drawings. The system locates the record in the Database Organization Datafile 60 having a value of "F", meaning feature screen, in screen type field 601, and a value in the screen field 602 equal to ScreenNum 102. The FrameInfo.DBFeatureNum array is set equal to the values in the feature one 603 through grouping fifteen fields 603 respectively for the record located. Incrementing the ordinate for each value in the FrameInfo(ordinate).Feature array, the system locates the position of the equivalent value in the FrameInfo.DBFeatureNum array. FrameInfo(ordinate).DBColumn is set equal to the position of the equivalent value in the FrameInfo.DBFeatureNum array.

Subsequent to the feature screen creation operation, response to the user's mouse movements and mouse clicks are administered by the Visual Basic System. If the user clicks on one of the radiobuttons 23, the system executes a subroutine entitled Radio_Click defined in FEATURES.FRM. Based upon the vicinity of the pointer 39, the system identifies the sequential position of a current grouping 35 within the feature screen 9 and the sequential position of a current alternative 36 within the current grouping 35 to identify a FrameInfo(ordinate).RBStatus(count). If the pointer 39 is resting on one of the available alternatives 7 that is also an unselected alternative 38, the FrameInfo.CurSelection for the current grouping 35 is set equal to the value of the current alternative 36 and FrameInfo.RBStatus for the current grouping 35 and the current alternative 36 is set to a negative one meaning "SELECTED". In a preferred embodiment capable of the automated deselective search, when one of the alternatives 6 is selected, the FrameInfo.SelectionOrder for the current grouping 35 is set equal to a NumberOfSelections variable (not shown) plus one and the NumberOfSelections variable is incremented. If the pointer 39 is resting on one of the alternatives having a FrameInfo.RBStatus of negative two meaning "FORCED" or zero meaning that it is one of the unavailable alternatives 8, there is no operation. If the pointer 39 is resting on one of the available alternatives 7 that is selected, then FrameInfo.CurSelection for the current grouping is reset. The NumberOfSelections variable is decremented and the FrameInfo.Selection order is resequenced. The system initiates a search operation.

If the user clicks on one of the listbox entries 16, the system executes a subroutine entitled ListBox_click in FEATURES.FRM. The system identifies the current grouping 35 and the current alternative 36. If the pointer 39 is resting on one of the available alternatives 7 that is not selected, the FrameInfo.CurSelection for the current grouping 35 is set equal to the current alternative 36 and FrameInfo.SelectionOrder is set equal to a value of the maximum current SelectionOrder which is expressed in the NumberOfSelections variable plus one and the NumberOfSelections variable is incremented. If the pointer 39 is resting on one of the available alternatives 7 that is selected, then FrameInfo.CurSelection for the current grouping 35 is reset. The NumberOfSelections variable is decremented and the FrameInfo.Selection order is resequenced. The system initiates a search operation.

Figure 23:
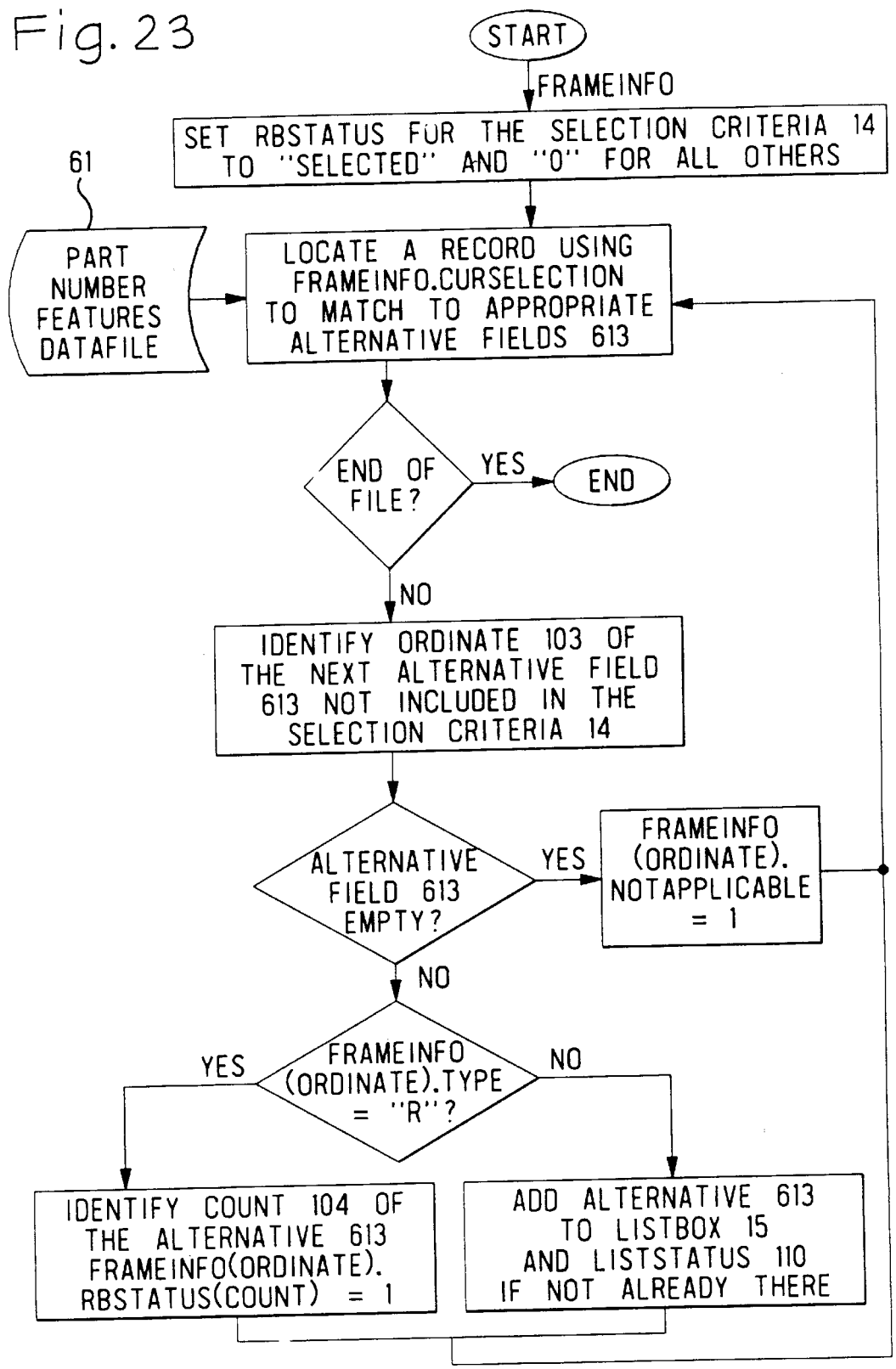
FIG. 23 is a graphical representation of the program flow of an embodiment of the Search operation initiated from the feature screen.

When the user either selects the search pushbutton 208 or double clicks on one of the unselected alternatives 38, the system performs a search operation using the current selection criteria 14. The current selection criteria 14 is defined as the set of selected alternatives 37 for the feature screen in which the user is operating, and is found in the FrameInfo.CurSelection array. A graphical representation of an embodiment of the search operation program flow is shown in FIG. 23. At the beginning of the search, in order to administer the radiobuttons 23, the system initializes the FrameInfo.RBStatus array for all available alternatives 7 to zero, and initializes FrameInfo.NotApplicable for all groupings 13 to zero. In order to administer the listboxes 15, a two dimensional dynamically allocated ListStatus array (not shown) is declared having a first dimension of fifteen and a second dimension of one. A ListStatusSize variable (not shown) is initialized to one and retains a value representing the size of the second dimension of the ListStatus array. A ListCounter array (not shown) having fifteen elements records the number of entries 16 added to each listbox 15 and is initialized to zero.

The system identifies all of the items 3 that match the current selection criteria 14. Using FrameInfo.CurSelection the system cross references to the Part Number Features Datafile 61 to locate a record having a value in the appropriate alternative field 613 equivalent to the first nonzero Frame Info.CurSelection. Incrementing an ordinate 103, the system identifies a FrameInfo(ordinate).CurSelection having a value greater than zero. FrameInfo(ordinate).DBColumn is used to identify the appropriate column in the Part Number Features Datafile 61. The system locates a record in the Part Number Features Datafile 61 having a matching value in the appropriate column. When a record is located having the alternative 6 that matches, the system compares the remaining alternatives 6 in the selection criteria 14 against values in the alternative fields 613 corresponding to the alternatives in the selection criteria 14. The system checks the remaining nonzero FrameInfo.CurSelection value against values in the appropriate alternative one through alternative fifteen fields 613. If all of the selected alternatives 37 in the selection criteria 14 have a corresponding alternative field 613 in the located record, the located record is a matching record for the current selection criteria 14. The matching record, therefore, represents an item 3 in the subfamily 2.

The system processes each item 3 in the subfamily 2 to identify which alternatives 6 are available alternatives 7 within the subfamily 2. If the record is a matching record, the alternative fields 613 in the matching record not specified in the selection criteria 14, are processed in an iterative loop to update the available alternatives 7 and unavailable alternatives 8 in FrameInfo. FrameInfo is used to revise the feature screen 9 based upon the results of the selection criteria 14 and search or more precisely, based upon the existing subfamily 2.

For each alternative field 613 checked, the following operation applies. If the alternative field 613 has no value, meaning that the grouping 13 associated with the alternative field 613 is not applicable to the item 3 defined in the matching record, the FrameInfo.NotApplicable is set to a value of one. The FrameInfo.NotApplicable variable is, therefore, zero if all items 3 in the subfamily 2 have a value in the alternative field 613 for the respective grouping 13, and is nonzero if any one item 3 in the subfamily 2 has no value in the respective alternative field 613 for the respective grouping 13. FrameInfo.NotApplicable having a nonzero value indicates that the associated grouping does not logically apply to all of the items in the subfamily 2. Therefore, with respect to a preferred embodiment, if FrameInfo.NotApplicable is set to nonzero, the respective grouping 13 is not displayed. Alternatively, in a less preferred embodiment, a grouping 13 is not displayed if all of the respective alternatives 6 are unavailable alternatives 8.

If the grouping 13 is a set of radiobuttons 23, and the alternative field 613 has a value, FrameInfo.RBStatus associated with the grouping 13 and alternative 6 specified in the alternative field 613 is set to a one, meaning that the radiobutton 23 for the specified alternative 6 is an available alternative 7. Available alternatives 7 are shown on the feature screen 9 in a bold font. If the grouping 13 is a listbox 15 and the alternative field 613 has a value, the system determines whether the alternative 5 specified in the alternative field 613 is already listed in the ListStatus array. If the alternative 6 has not already been added, the ListCounter is incremented for the respective listbox 15, the ListStatusSize is set to reflect the size of the largest listbox, and if necessary, the ListStatus array 110 is dynamically allocated a single additional element. The ListStatus array 110 for the sequential position of the grouping 13, specified in the first dimension, and the sequential position of the alternative 6, specified in the second dimension, is set equal to the value in the alternative field 613. The operation repeats for all alternative fields 613 that were not used to locate an item from the selection criteria.

In a preferred embodiment, if a search operation results in a subfamily 2 having no items 3, the most recently selected alternative will be automatically deselected and the search operation will repeat with the revised selection criteria 14. The automatic deselection of the most recently selected alternative will repeat until the search operation results in a subfamily 2 having at least one item 3. Although not implemented in the source code of the software disclosed herein, the automatic deselection operation would be implemented as follows. Where FrameInfo (ordinate).SelectionOrder is equal to the NumberOfSelections variable, the FrameInfo(ordinate).CurSelection and FrameInfo(ordinate).SelectionOrder will be reset to zero, and the Number of Selections will be decremented. The same search process will be initiated using the new selection criteria 14. The automatic deselection will repeat until the search results in a subfamily 2 having one or more items 3.

The entire FrameInfo updating process occurs for every record in the Part Number Features Datafile 61. The results of the Searching operation are updated FrameInfo and ListStatus arrays. The FrameInfo and ListStatus arrays are used to revise the feature screen according to the results of the search.

Figure 24:
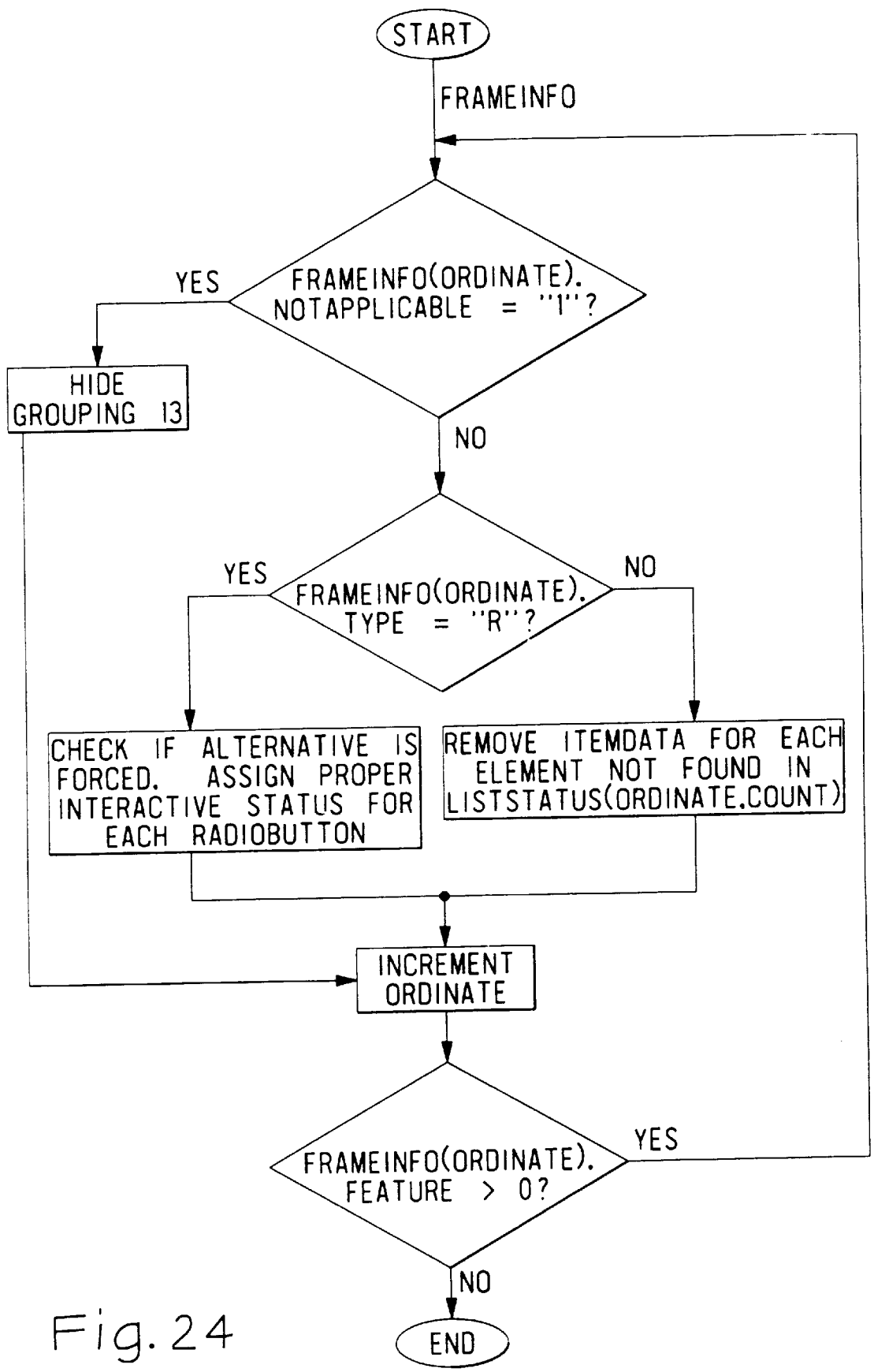
FIG. 24 is a graphical representation of the program flow of an embodiment of the feature screen revision operation.
Figure 25:
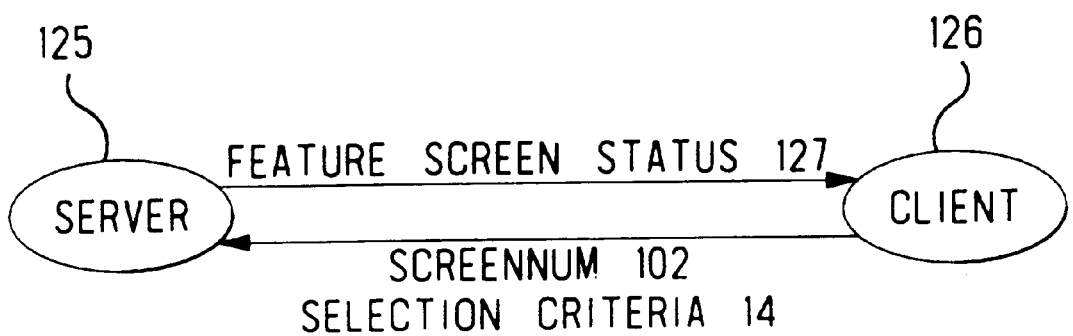
FIG. 25 is a representation of a server and client configuration and the flow of data therebetween.
Figure 31:
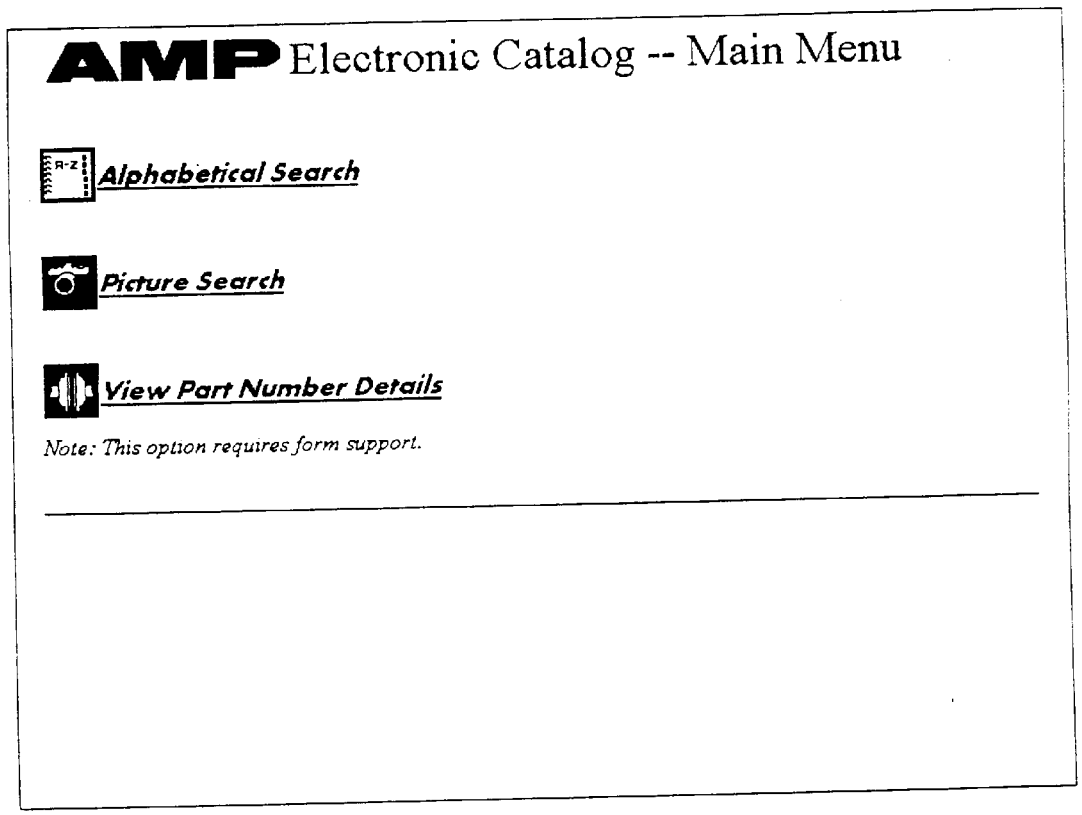
FIG. 31 is a main menu used in a preferred embodiment of the invention in the Internet environment.
Figure 33:
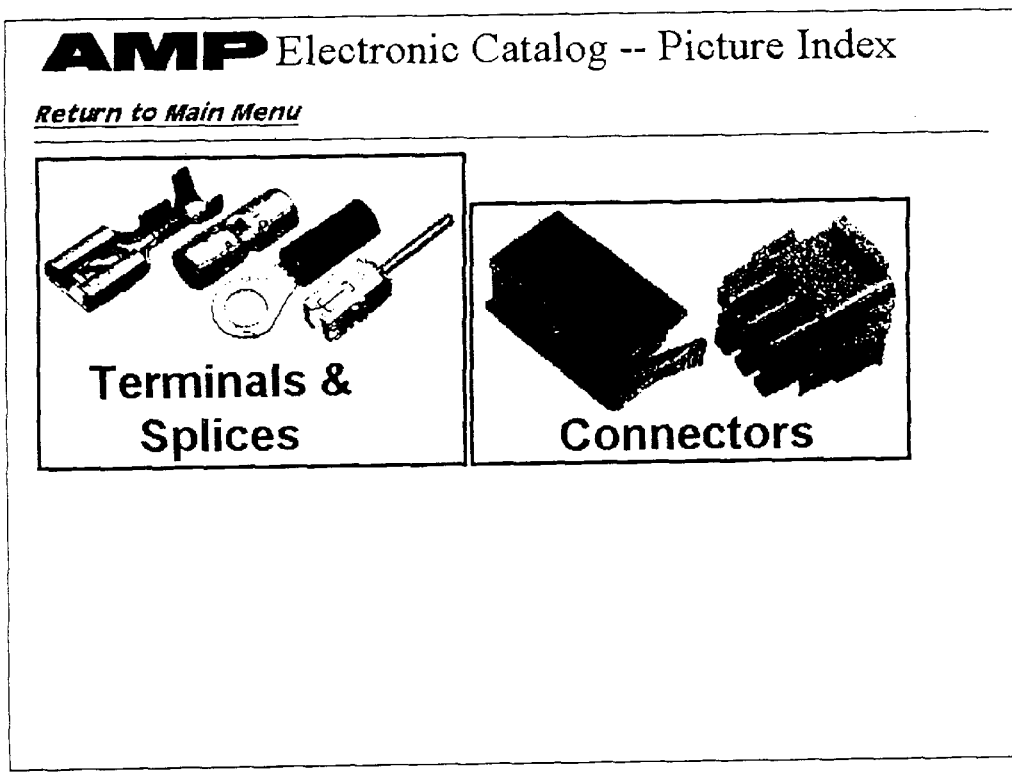
FIGS. 33 and 34 is a first and second level picture search menu respectively used in a preferred embodiment of the invention in the Internet environment.
Figure 34:
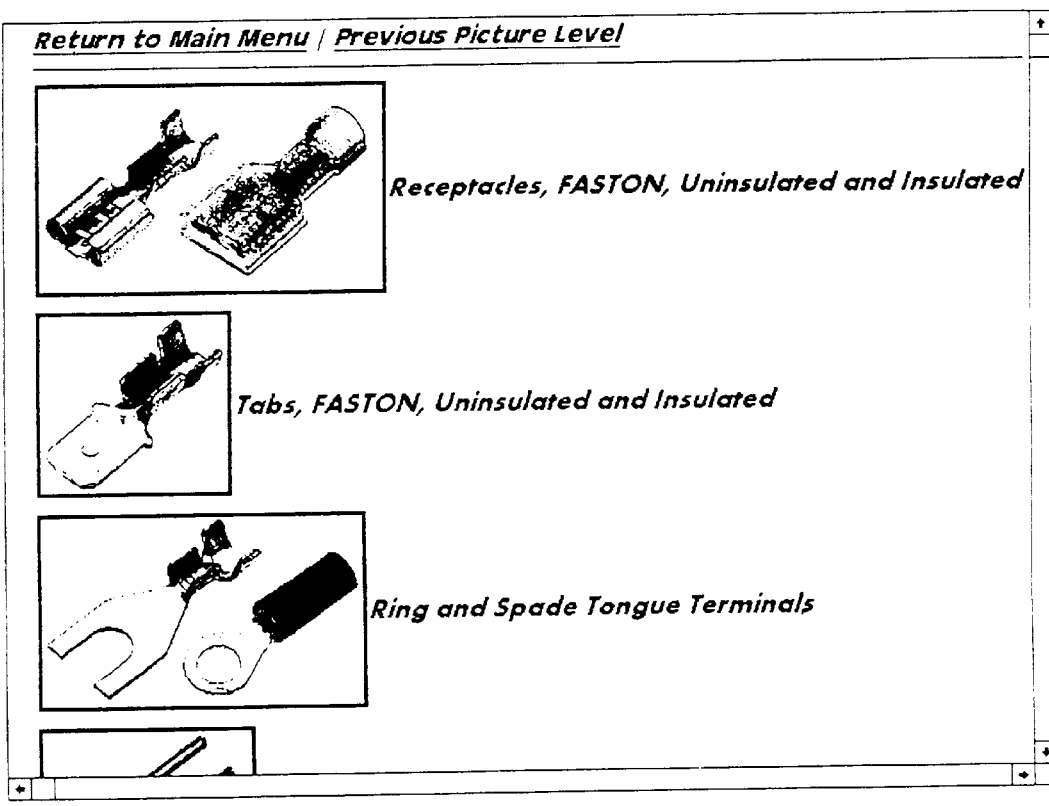

Using the updated FrameInfo and ListStatus arrays, the system revises the feature screen 9 accordingly in the feature screen revision operation. A graphical representation of an embodiment of the feature screen revision operation is shown in FIG. 24. The feature screen revision operation comprises enabling radiobuttons 23 for the available alternatives 7, disabling the radiobuttons 23 for the unavailable alternatives 8, identifying and disabling the radiobuttons 23 for forced alternatives 34, updating the ItemData array with listbox entries 16 for the available alternatives 7 and unavailable alternatives 8, and removing the grouping 13 from the feature screen 9 if all of the alternatives 6 in the grouping 13 are unavailable alternatives 8. A loop incrementing the ordinate 103 iterates for each grouping 13. In a preferred embodiment, if FrameInfo.NotApplicable is nonzero, the grouping 13 associated with the FrameInfo (ordinate) will not be displayed. If the grouping 13 comprises radiobuttons 23, the radiobutton 23 associated with each element in the FrameInfo.RBStatus array that equals zero is disabled. If the grouping 13 is a listbox 15, the ListStatus array for the grouping 13 is searched against the ItemData array. If an element in the ItemData array for the grouping 13 is not found in the ListStatus array 110, it is removed from the ItemData array and therefore. does not appear as one of the listbox entries 16. For each grouping 13 that does not contain a selected alternative 37, the system counts the number of available alternatives 7 in the FrameInfo(ordinate).RBStatus array. If there is one and only available alternative 7, the one available alternative 7 is set to a negative two, meaning "FORCED", and the associated radiobutton 23 is turned "on" and is displayed as partially filled in black, but it is disabled meaning that it may not be toggled to ("off") during the feature screen manipulation operation.

After the feature screen revision operation, the system returns to the feature screen manipulation operation permitting the user to modify the selection criteria 14 based upon the results of the search.

In an embodiment of the invention in an Internet environment, there is a server computer 125 and a client computer 126. All of the program files and data files described in the local embodiment reside on the server 125. In the Internet embodiment, the server 125 comprises a computer having a minimum of 8 Mbytes of RAM and 50 MBytes of available hard disk memory and an Intel Pentium processor running Microsoft Windows 3.1. The server 125 may have hardware access to the Internet via any conventional method. Server 125 communication on the Internet uses Microsoft Windows World Wide Web Server using HyperText Transport Protocol ("HTTPD") from the National Center for Supercomputing Applications ("NCSA") at the University of Illinois and Windows TCP/IP package that supports Windows Sockets interface, preferably Chameleon TCP/IP for Windows by NetManage, Inc. of Cupertino, Calif. The client 126 is a computer having a minimum of 4 MBytes of RAM and an Intel 80386 processor running Microsoft Windows 3.1 and having a display device, keyboard, and mouse. The client 126 has TCP/IP access to the Internet, such as Chameleon by NetManage. The client 126 also requires a Mosaic compatible browser, such as AIR Mosaic by SPRY, Inc. of Seattle, Wash.

A preferred embodiment of the Internet embodiment of the electronic catalog application mirrors the user flow in the local embodiment as much as possible. Based upon certain restrictions inherent in current Internet capabilities with respect to building an interactive screen, the feature screen 9 for the Internet embodiment has a layout that is slightly different from the local embodiment. The feature screen 9 for the Internet embodiment is shown by way of example in FIGS. 26 through 29.

The client 126 initiates a request to the server 125 for the electronic catalog searching application via the Internet. The server 125 detects the request. Receipt of the request executes the requested application on the server 125 that permits a user on the client 126 to select a family 1 or subfamily 2. Example of Main Menu, Alphabetical search, Picture Search, and View Part Number screens are shown in FIGS. 31 through 35. When the family 1 or subfamily 2 is chosen, the server 125 sends a feature screen status 127 to the client 126. The feature screen status 127 comprises a feature screen code, ScreenNum 102 in a preferred embodiment, all features 5 appropriate to the feature screen 9 specified in ScreenNum 102, all available alternatives 7, all unavailable alternatives 8, and the selection criteria 14.

As the selection criteria 14 is always sent, it may comprise zero selected alternatives 37. It is apparent, therefore, that the server 125 sends all of the information necessary to define the current subfamily 2 to the client 126. The information, therefore, need not be retained in memory on the server 125. This particular feature renders it particularly appropriate for an Internet environment. The client 126 receives the feature screen status 127 and displays the feature screen 9 accordingly. An example of the feature screen 9 on the Internet is shown in FIGS. 26 through 29. The user on the client, makes selections from among the available alternatives 7 generating a selection criteria 14 different from that which was set to it. The client 126 initiates a search with the modified selection criteria 14. The client 126 sends to the server 125, the ScreenNum 102 value sent to it by the server, and the modified selection criteria 14. The server 125 receives the ScreenNum 102 and the selection criteria 14. The server 125 executes the search operation as disclosed hereinabove using the revised selection criteria 14 and generates the feature screen status 127. The server 125 sends the feature screen status 127 that has been updated based on the modified selection criteria 14 to the client 126. The client 126 receives the feature screen status 127 and displays the updated feature screen 9. This process may iterate similar to the local version to further narrow the subfamily as desired.

The feature screen 9 in a preferred embodiment, permits the user to choose to view the representative picture 17 by selecting a view family picture pushbutton 211. When the user on the client 126 selects the view family picture pushbutton 211, the client 126 sends a request to the server 125 for the picture 17 as well as the feature screen code, ScreenNum 102.

The user accesses the property screen 12 by selecting the detail view pushbuttton 207. An example of the property screen 12 format for the Internet embodiment is shown in FIG. 30. When the user on the client 126 selects the detail view pushbutton 207, the client 126 sends to the server 125 the feature screen code, ScreenNum 102, and the selection criteria 14. The server 125 returns the features 5, the alternatives 6, the properties 28, and the line art 29 for the item 3, or the first item in a larger subfamily 2, satisfying the selection criteria 14. To view the property screen 12 for the next item 3 listed in the subfamily 2, the user on the client 126 selects a next pushbutton 212. Selection of the next pushbutton 212 causes the client 126 to initiate a request to the server 125. The client 126 sends to the server 125 the feature screen code, the selection criteria 14, a request for property screen information, and an indication of which item of the subfamily 2 is of interest.

We claim:

1. A method of allowing a selection of a subset of items from a set of items using a server and a database, the server being coupled to the database, the method comprising:

(a) responsive to receiving a first request, accessing the database, the database defining a set of groups, each group in the set of groups having a corresponding set of alternatives, the database defining at least one alternative for each item in the set of items, and wherein the set of groups includes at least one group having more than one alternative;

(b) transmitting a first response, the first response including first formatting information to display the set of groups and a first corresponding sets of alternatives, the first formatting information including instructions to simultaneously display at least two alternatives from the at least one group;

(c) responsive to receiving a second request, accessing the database to determine the subset of items, the second request corresponding to a selection of at least an alternative from the set of groups, the subset of items all including the selected alternative; and (d) transmitting a second response, the second response including second formatting information to display the set of groups and a second corresponding sets of alternatives, the second corresponding sets of alternatives being determined from the subset of items and including at least one unavailable alternative, the second formatting information including instructions to display the unavailable alternative and any available alternatives in the second set of alternatives.

2. The method according to claim 1 wherein the first and second requests correspond to an Internet protocol formatted request, and wherein the first and second responses correspond to an Internet protocol formatted response.

3. The method according to claim 1 wherein the first formatting information includes HTML formatted text wherein at least one alternative of the set of alternatives is shown as a hypertext link.

4. The method according to claim 3 wherein the first formatting information includes a name for each group in the set of groups, and wherein each name is not a link.

5. The method according to claim 1 wherein the transmitting the second information includes HTML formatted text wherein each available alternative is shown as a hypertext link and wherein each unavailable alternative is shown as text but is not a hypertext link.

6. The method according to claim 1 further comprising reducing the number of items in the subset of items by repeating the steps of accessing the database in response to the second request and transmitting the second response.

7. The method according to claim 6 further comprising increasing the number of items in the subset of items by deselecting a selected alternative if the subset of items comprises zero items.

8. The method according to claim 1 wherein the second information includes the information about the number of items in the subset of items.

9. A system for assisting a user in identifying a subfamily of items within a family of items, comprising the steps of:

(a) means for providing a computer readable data file of stored information representing at least one family of items, wherein the family has features associated therewith and each said feature has alternatives associated therewith, the family comprising a plurality of items wherein each said item has one said alternative associated with each said feature, (b) means for displaying said features and said alternatives on a feature screen;

(c) means for accepting at least one selected alternative;

(d) means for determining the subfamily wherein each item in the subfamily satisfies said selected alternatives;

(e) means for determining available alternatives and unavailable alternatives represented by the subfamily; and (f) means for revising said feature screen to reflect said available alternatives as distinct from said unavailable alternatives.

10. The system according to claim 9 wherein, each said available alternative is displayed in a first format, each said unavailable alternative is displayed in a second format, and each said selected alternative is displayed in a third format.

11. The system according to claim 9 wherein, said first format is a grey shaded font, and said second format is a bold font.

12. The system according to claim 9 and further comprising means for displaying at least one grouping, each said grouping comprising one of said features visually related to respective alternatives.

13. The system according to claim 12 wherein, if said grouping does not contain at least one available alternative, said grouping is not displayed.

14. The system according to claim 9 further comprising means for displaying a plurality of pictures, each said picture representing one family and being selectable by a user to identify one family.

15. The system according to claim 9 further comprising means for displaying an alphanumeric list of entries, each said entry representing one family and being selectable by a user to identify one family.

16. The system of claim 9 further comprising means for:
   (a) providing a user selector for each item of said subfamily,
   (b) receiving a signal identifying a single item within said subfamily, and
   (c) displaying additional information about said item.

17. The system of claim 16 wherein said additional information comprises detailed specifications concerning said item.

18. The system of claim 16 wherein said additional information comprises a pictorial representation of said single member.

19. A system for assisting a user in identifying a subfamily of items within a family of items, comprising:
   (a) a database, the database representing at least one family of items and identifying at least one alternative for each item;
   (a) a computer system, being coupled to the database, having a first program to display available alternatives represented in the family, the computer system having an input to receive selected alternatives, the computer system further having a second program to determine a subfamily of items wherein each said item in said subfamily contains the selected alternatives, and wherein the first program revises the display to display said available alternatives represented in the subfamily as distinct from unavailable alternatives unrepresented in the subfamily.

20. The system according to claim 19 wherein, the computer system has a server computer coupled to a client computer, the server computer having the second program and the client computer having the first program.

* * * * *

UNITED STATES PATENT AND TRADEMARK OFFICE
CERTIFICATE OF CORRECTION

PATENT NO. : 5,983,219
DATED : November 9, 1999
INVENTOR(S) : Danish, et. al.

It is certified that error appears in the above-identified patent and that said Letters Patent is hereby corrected as shown below:

Title page, item [73], Assignee: change "Saggara Systems, Inc." to -- Saqqara Systems, Inc.--

Signed and Sealed this

Fourth Day of July, 2000

Attest:

Q. TODD DICKINSON

Attesting Officer

Director of Patents and Trademarks